(12) United States Patent
Foote et al.

(10) Patent No.: US 7,944,371 B2
(45) Date of Patent: May 17, 2011

(54) EXTERIOR MIRROR WITH INDICATOR

(75) Inventors: Keith D. Foote, Grand Rapids, MI (US);
Niall R. Lynam, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 287 days.

(21) Appl. No.: 12/264,669

(22) Filed: Nov. 4, 2008

(65) Prior Publication Data

US 2009/0115631 A1    May 7, 2009

Related U.S. Application Data

(60) Provisional application No. 61/019,478, filed on Jan. 7, 2008, provisional application No. 60/985,446, filed on Nov. 5, 2007.

(51) Int. Cl.
*G08G 1/16* (2006.01)
(52) U.S. Cl. ........ 340/903; 340/904; 340/433; 340/468; 340/472; 340/475
(58) Field of Classification Search .................. 340/904, 340/815.4, 903, 433, 468, 472, 475; 359/843, 359/844; 701/301, 96
See application file for complete search history.

(56) References Cited

U.S. PATENT DOCUMENTS

| | | |
|---|---|---|
| 5,033,835 A | 7/1991 | Platzer, Jr. |
| 5,050,977 A | 9/1991 | Platzer, Jr. |
| 5,080,492 A | 1/1992 | Platzer, Jr. |
| 5,371,659 A | 12/1994 | Pastrick et al. |
| 5,497,305 A | 3/1996 | Pastrick et al. |
| 5,497,306 A | 3/1996 | Pastrick |
| 5,550,677 A | 8/1996 | Schofield et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,715,093 A | 2/1998 | Schierbeek et al. |

(Continued)

FOREIGN PATENT DOCUMENTS

EP    0728618    8/1996

(Continued)

OTHER PUBLICATIONS

U.S. Appl. No. 12/187,725, filed Aug. 7, 2008.

*Primary Examiner* — Daryl Pope
(74) *Attorney, Agent, or Firm* — Van Dyke, Gardner, Linn & Burkhart, LLP

(57) ABSTRACT

A mirror reflective element sub-assembly suitable for use for an exterior rearview mirror assembly of a vehicle includes a mirror reflective element, a mirror back plate having an indicator receiving portion established thereat, and a signal indication module having a light source. The signal indication module attaches to the indicator receiving portion of the mirror back plate and the light source is activatable to emit light through the indicator receiving portion. The light source is established at a circuit element and the signal indication module includes a housing that substantially encases the circuit element therein. The circuit element has electrical terminals extending therefrom and protruding at least partially at a connector portion of the housing so as to be electrically connectable to a power source of the vehicle. The connector portion of the housing is configured to provide a plug-socket connection between the power source and the signal indication module.

8 Claims, 13 Drawing Sheets

U.S. PATENT DOCUMENTS

| | | |
|---|---|---|
| 5,760,962 A | 6/1998 | Schofield et al. |
| 5,786,772 A | 7/1998 | Schofield et al. |
| 5,796,094 A | 8/1998 | Schofield et al. |
| 5,823,654 A | 10/1998 | Pastrick et al. |
| 5,863,116 A | 1/1999 | Pastrick et al. |
| 5,910,854 A | 6/1999 | Varaprasad et al. |
| 5,929,786 A | 7/1999 | Schofield et al. |
| 6,097,023 A | 8/2000 | Schofield et al. |
| 6,176,602 B1 | 1/2001 | Pastrick et al. |
| 6,198,409 B1 | 3/2001 | Schofield et al. |
| 6,201,642 B1 | 3/2001 | Bos |
| 6,227,689 B1 | 5/2001 | Miller |
| 6,250,148 B1 | 6/2001 | Lynam |
| 6,276,821 B1 | 8/2001 | Pastrick et al. |
| 6,315,419 B1 | 11/2001 | Platzer, Jr. |
| 6,341,523 B2 | 1/2002 | Lynam |
| 6,396,397 B1 | 5/2002 | Bos et al. |
| 6,420,036 B1 | 7/2002 | Varaprasad et al. |
| 6,498,620 B2 | 12/2002 | Schofield et al. |
| 6,522,451 B1 | 2/2003 | Lynam |
| 6,582,109 B2 | 6/2003 | Miller |
| 6,690,268 B2 | 2/2004 | Schofield et al. |
| 6,717,610 B1 | 4/2004 | Bos et al. |
| 6,717,712 B2 | 4/2004 | Lynam et al. |
| 6,757,109 B2 | 6/2004 | Bos |
| 6,882,287 B2 | 4/2005 | Schofield |
| 7,005,974 B2 | 2/2006 | McMahon et al. |
| 7,038,577 B2 | 5/2006 | Pawlicki et al. |
| 7,097,312 B2 | 8/2006 | Platzer, Jr. |
| 7,126,456 B2 | 10/2006 | Boddy et al. |
| 7,168,830 B2 | 1/2007 | Pastrick et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,338,177 B2 | 3/2008 | Lynam |
| 7,339,149 B1 | 3/2008 | Schofield et al. |
| 7,370,983 B2 | 5/2008 | DeWind et al. |
| 7,377,675 B2 | 5/2008 | Pastrick et al. |
| 7,400,435 B2 | 7/2008 | Byers et al. |
| 7,420,756 B2 | 9/2008 | Lynam |
| 2002/0105741 A1 | 8/2002 | Platzer, Jr. |
| 2003/0117731 A1 | 6/2003 | Platzer, Jr. |
| 2004/0165291 A1 | 8/2004 | Platzer, Jr. |
| 2005/0232469 A1 | 10/2005 | Schofield et al. |
| 2005/0248859 A1 | 11/2005 | Platzer |
| 2006/0061008 A1 | 3/2006 | Karner et al. |
| 2006/0125919 A1 | 6/2006 | Camilleri et al. |
| 2006/0184297 A1 | 8/2006 | Higgins-Luthman |
| 2006/0268440 A1 | 11/2006 | Platzer, Jr. |
| 2007/0058257 A1* | 3/2007 | Lynam .................. 359/604 |
| 2008/0212189 A1 | 9/2008 | Baur et al. |
| 2008/0225421 A1 | 9/2008 | Platzer |
| 2008/0304170 A1 | 12/2008 | Zhao |

FOREIGN PATENT DOCUMENTS

| | | |
|---|---|---|
| EP | 0729864 | 9/1996 |
| WO | WO 0181956 | 11/2001 |
| WO | WO 2004026633 | 4/2004 |
| WO | WO 2004047421 | 6/2004 |
| WO | WO 2004103772 | 12/2004 |
| WO | WO 2006124682 | 11/2006 |
| WO | WO 2007005942 | 1/2007 |
| WO | WO 2008051910 | 5/2008 |

* cited by examiner

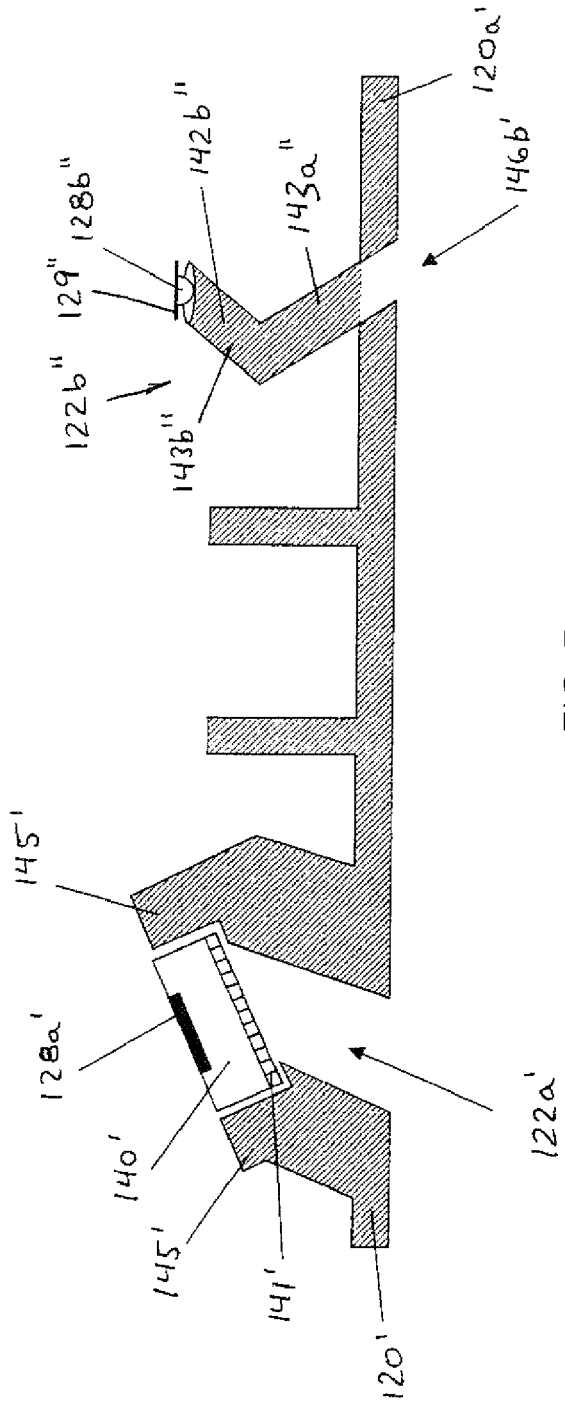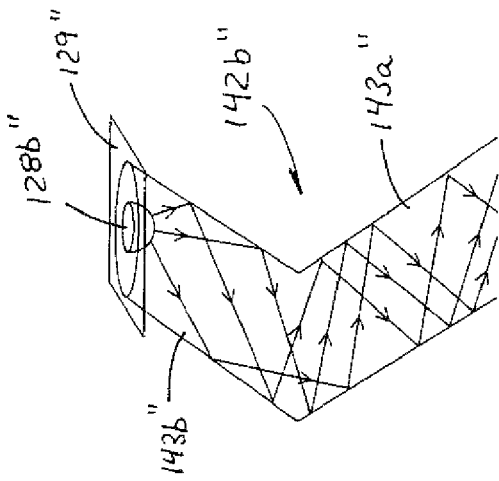
FIG. 7
FIG. 7A

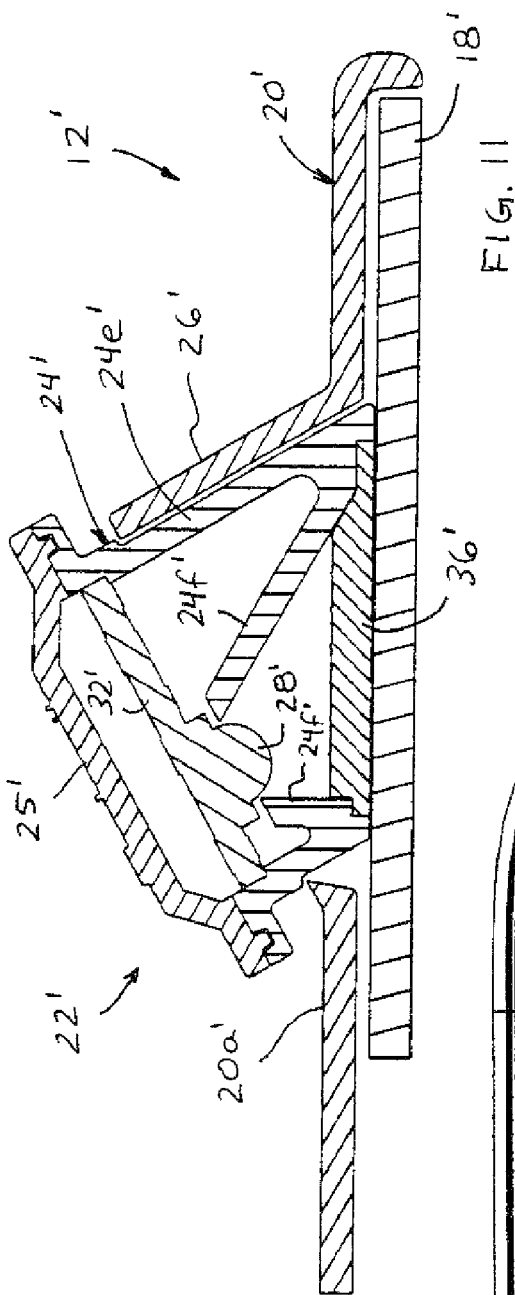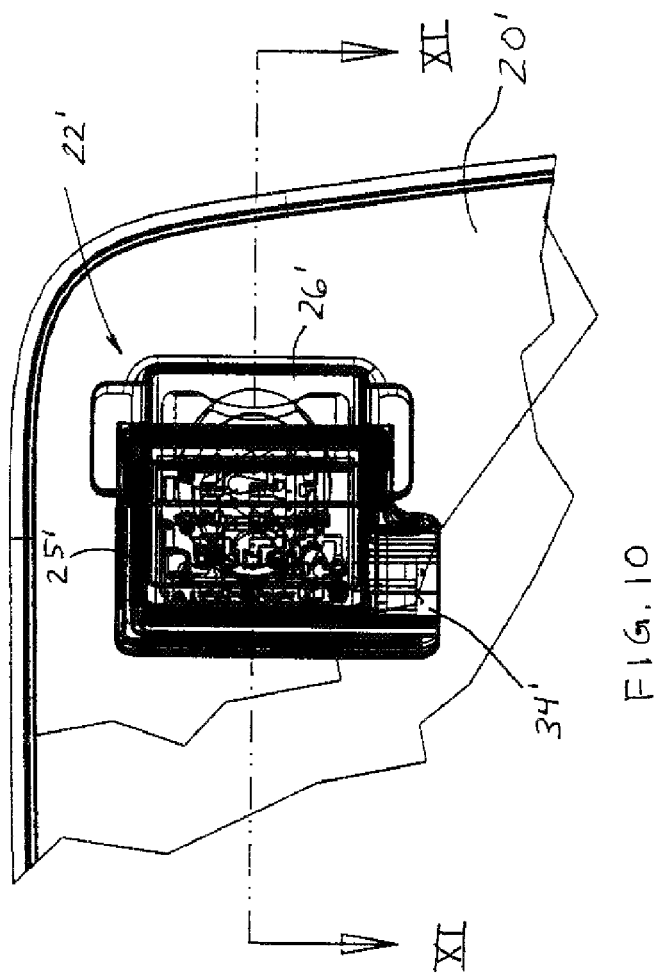

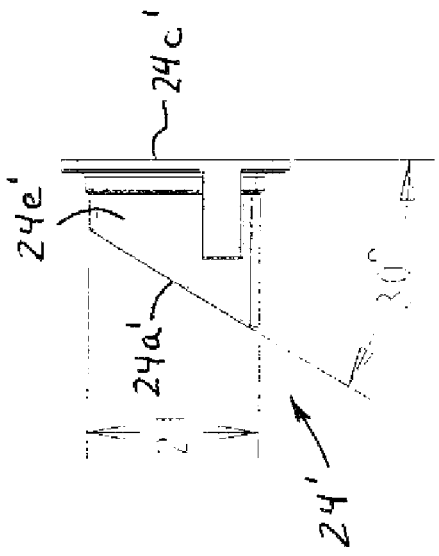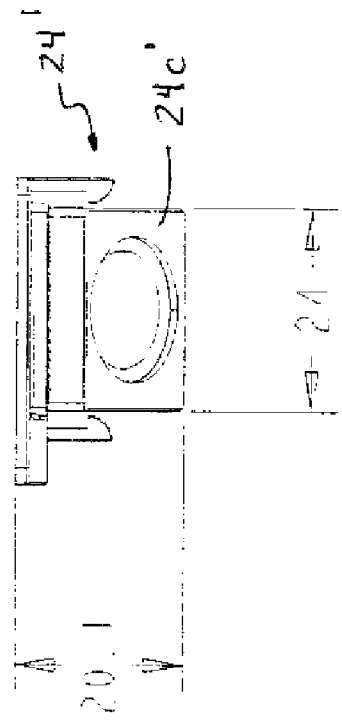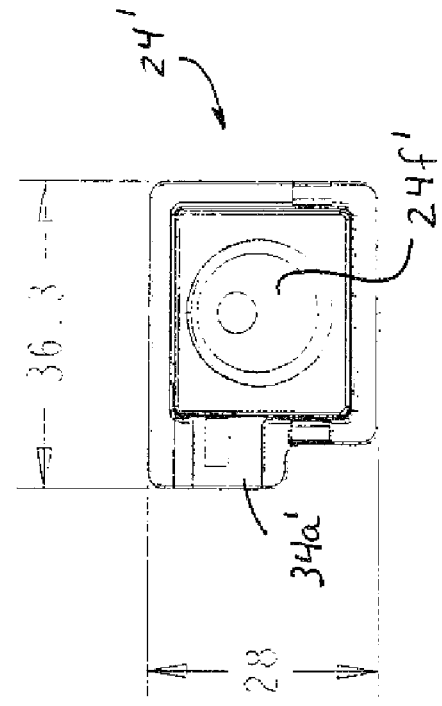

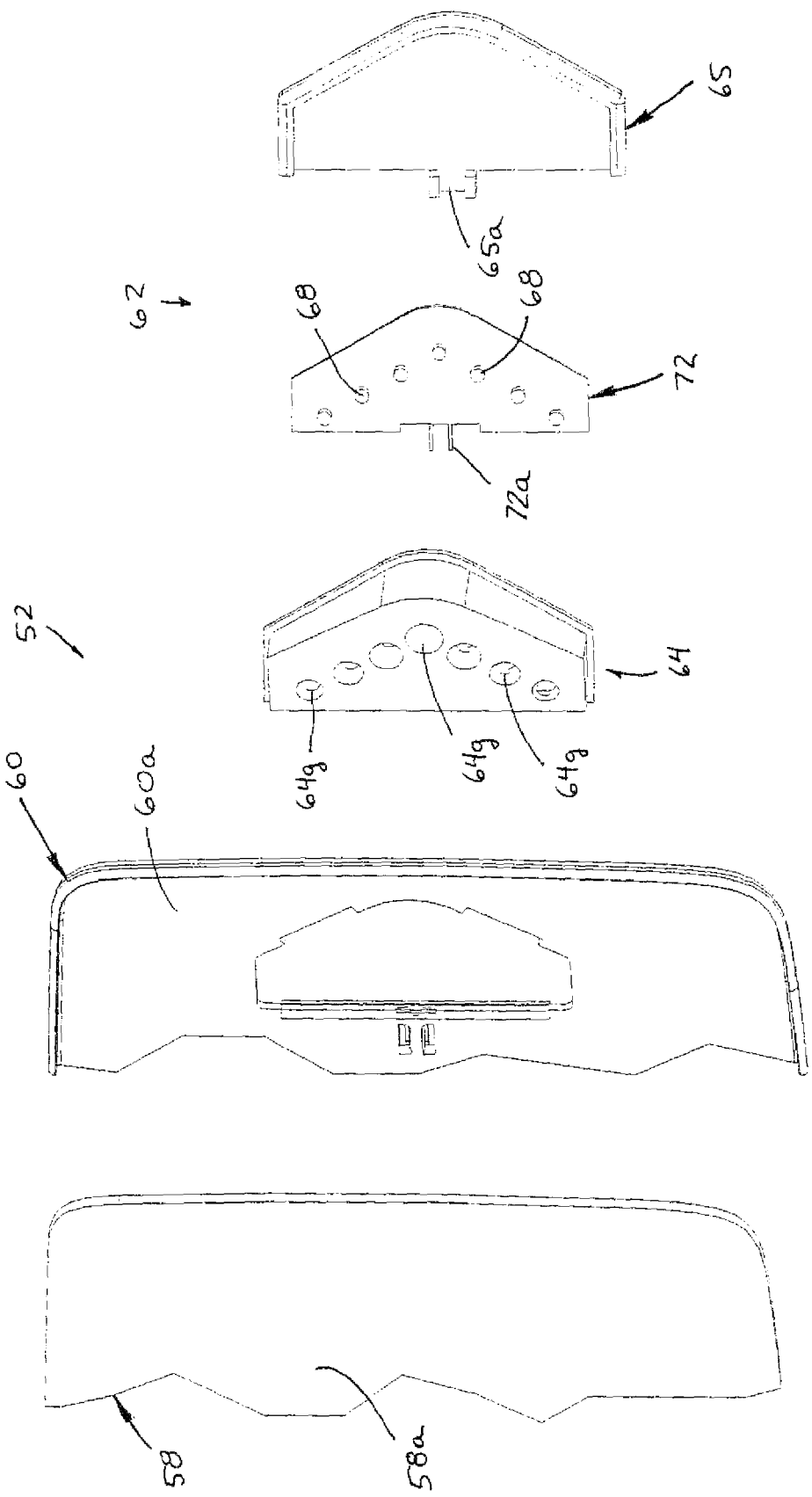

US 7,944,371 B2

EXTERIOR MIRROR WITH INDICATOR

CROSS REFERENCE TO RELATED APPLICATIONS

The present application claims benefit of U.S. provisional applications, Ser. No. 61/019,478, filed Jan. 7, 2008, and Ser. No. 60/985,446, filed Nov. 5, 2007, which are hereby incorporated herein by reference in their entireties.

FIELD OF THE INVENTION

The present invention relates to exterior rearview mirror assemblies and, more particularly, to an exterior rearview mirror assembly having a blind spot/object detection indicator and/or a lane change aid (LCA) indicator and/or a turn signal or other indicator at the exterior rearview mirror assembly.

BACKGROUND OF THE INVENTION

It is known to provide an object in a blind spot detection/LCA system for a vehicle that detects the presence of another vehicle or object in the lane next to the host vehicle, where it may be difficult for the driver of the host vehicle to determine whether or not there is another vehicle or object adjacent to the host vehicle. Such an object in a blind spot detection/LCA system often includes a visual indicator that visually indicates the detection of another vehicle or object to the driver of the host vehicle. It is also know to provide a turn signal indicator that is activated when a turn signal is activated by the driver of the host vehicle so as to provide an indication of the vehicle turning or changing lanes to the driver of a vehicle in an adjacent lane to the host or subject vehicle or to another person external to the host or subject vehicle. The visual indicator or indicators (commonly a light emitting diode or the like) of such systems is/are often located at the mirror reflective element of the exterior rearview mirror assembly.

The object/LCA visual indicator or indicators indicate or alert the driver of the host vehicle of the presence or impending presence of another vehicle or object in a blind spot in an adjacent side lane that typically cannot be readily seen within the field of view of the exterior mirror reflective element of the exterior mirror assembly mounted at that side of the vehicle and/or cannot be readily seen by the driver's peripheral vision or the like. The object/LCA visual indicators typically are arranged to be viewable principally or solely by the driver of the host vehicle and not by drivers of other vehicles. Similarly, the turn signal visual indicator or indicators indicate or alert a person external of the host vehicle (such as the driver of another vehicle alongside or approaching the host vehicle) that the turn signal of the host vehicle is activated to indicate that the driver of the host vehicle is contemplating or commencing a turn or lane change or the like. It is desirable that such turn signal visual indicators are not readily viewable by the driver of the host vehicle when they are activated. Because of vehicle regulations and mirror and vehicle configurations and geometries, and because of the need to provide an uninterrupted reflective surface to satisfy the likes of the FMVSS 111 field of view regulation, blind spot/LCA indicators in the prior art are typically located towards or at the outboard edge, and typically towards or at the upper corner/quadrant, of the reflective mirror element of the exterior mirror assembly.

Somewhat costly and complicated indicator constructions have been contemplated that, when placed behind and supported by the mirror reflective element, attempt to have their projected beam of emitted light directed principally to be viewed by the driver of the host vehicle (or other persons external to the host vehicle for turn signal applications) through the mirror reflective element and shielded from view by other drivers in blind spot alert detection systems (or from the driver of the host vehicle for turn signal applications). In some applications, the mirror reflective element may have a transflective reflector coating or may have a window or port formed in a non-transflective reflector coating. For example, transflective mirror coatings (such as, for example, those described in U.S. Pat. Nos. 3,280,701; 6,855,431; 5,724,187; 5,340,503; 6,286,965; 6,196,688; 6,045,023; 5,788,357; 5,535,056; 5,751,489; and 6,065,840, which are hereby incorporated herein by reference in their entireties) may be used, or alternately, a transmissive window or port may be formed in the reflective coating or coatings of the mirror reflective element (such as, for example, those described in U.S. Pat. Nos. 6,005,724; 6,257,746; 6,111,683, 5,786,772, 5,313,335 and 5,285,060, which are hereby incorporated herein by reference in their entireties). An illumination source or indicator may be positioned so as to direct or emit illumination through the window or display area and toward the driver of the host vehicle so as to be viewable by the driver of the host vehicle (or outwardly away from the vehicle so as to be generally not viewable by the driver of the host vehicle for turn signal applications).

Such a mirror assembly and indicator often include a baffle or other light directing element and an illumination source positioned at the rear of the mirror reflective element (and generally at the transmissive window or port if applicable). The baffle shields from view by an observer or the light directing element directs the light or illumination from the illumination source toward the desired or appropriate viewer (such as the driver of the host vehicle for blind spot/LCA applications or the driver of another vehicle for turn signal applications) and away from others (such as away from other drivers for blind spot/LCA applications or away from the driver of the host vehicle for turn signal applications).

Typically, such baffles or other light directing elements are adhered to the rear surface of the mirror reflective element. In some applications, the illumination source may be provided as a module to the mirror assembly facility and adhered to the rear of the mirror reflective element as a unit or module (for instance, light from LEDs facing and emitting light in the direction away from the mirror element, may be reflected back towards the mirror reflector, and hence through the mirror element, using suitably angled or disposed mirrored surfaces). After the baffle or module is attached to the reflective element, the back plate of the mirror assembly may be adhered to the mirror reflective element to complete the mirror reflector sub assembly that is then assembled with the actuator and casing and other components to form the complete mirror assembly for mounting to the side of the vehicle.

A variety of interior and exterior mirror assemblies with indicators are known in the art, such as U.S. Pat. Nos. 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692; and 5,786,772, and Canadian Pat. No. CA 1,063,695, and Great Britain Patent Specification 1,172,382 and Pat. Abstracts of Japan Publication No. 0917573, published Jul. 8, 1997, and PCT Publication WO 95/30495, published Nov. 16, 1995, which are all hereby incorporated herein by reference in their entireties.

Therefore, there is a need in the art for an improved object in a blind spot/LCA indicator that is readily viewable by a driver of the host vehicle and not visible or viewable by a driver of another vehicle and/or an improved turn signal indicator that is readily viewable by the driver of another vehicle and not visible or viewable by the driver of the host vehicle.

SUMMARY OF THE INVENTION

The present invention provides an object in a blind spot indicator or lane change assist (LCA) indicator or turn signal indicator or other indicator that is integral with the mirror reflector carrier or back plate of the mirror reflector sub-assembly so as to be positioned at and attached to the mirror reflective element as the back plate is adhered or otherwise attached at the back of the mirror reflective element. Preferably, the signal indicator is provided as a sealed or substantially sealed unit or module that can be snapped into or otherwise attached or secured preferably mechanically but optionally adhesively) at the mirror back plate (and does so substantially or wholly sealingly to limit or substantially preclude water ingress to the module so that the module and back plate are substantially water impervious), preferably at the mirror sub-assembly manufacturing operation when the mirror reflective element (and any associated heater or other item or element) is joined to the mirror back plate. The indicator assembly or indicator module of the present invention may utilize aspects of the indicators described in U.S. Pat. Nos. 7,038,577; 6,882,287; 6,198,409; 5,929,786; and 5,786,772, and/or U.S. patent applications, Ser. No. 11/520,193, filed Sep. 13, 2006; Ser. No. 11/226,628, filed Sep. 14, 2005; and/or Ser. No. 11/315,675, filed Dec. 22, 2005, and/or PCT Application No. PCT/US2006/026148, filed Jul. 5, 2006 and published Jan. 11, 2007 as International Publication No. WO 2007/005942, and/or PCT Application No. PCT/US2006/018567, filed May 15, 2006 and published Nov. 23, 2006 as International Publication No. WO 2006/124682, and/or PCT Application No. PCT/US07/82099, filed Oct. 23, 2007; and/or U.S. provisional application Ser. No. 60/954,953, filed Aug. 9, 2007, which are all hereby incorporated herein by reference in their entireties. The present invention thus provides a mirror reflector carrier or back plate with an integrated blind spot indicator/indicators and/or turn signal indicator/indicators and/or other indicator/indicators.

According to an aspect of the present invention, an exterior rearview mirror assembly for a vehicle includes a mirror reflective element, a back plate and an indicator or display device. The back plate may be molded or formed with a receiving portion or mounting portion or pocket for receiving or mounting an indicator assembly or module thereto. The back plate is attached to the rear surface of the reflective element (the surface opposite the front surface, with the front surface facing generally rearward and toward the driver of the vehicle when the mirror assembly is mounted to the vehicle). The indicator mounting portion extends rearward away from the reflective element and may be integrally formed with the back plate, preferably by injection molding. The indicator assembly or module includes a housing that houses at least one illumination source, such as a light emitting diode, and includes electrically conducting terminals electrically connected to the illumination source and accessible at the housing (such as at a plug or socket portion of the housing) for electrical connection of the indicator module to an electrical lead of the mirror assembly.

The housing is preferably formed so as to be readily attached or connected or snapped to the receiving portion or mounting portion of the back plate. When so mounted, light emitted by the light source or sources of the indicator module is transmitted through the reflective element for viewing by a person viewing the reflective element at an angle that generally corresponds to the angle established by the indicator mounting portion and/or housing, while shielding or shading the light from viewing by a person viewing the reflective angle at another angle that does not generally correspond to the angle established by the indicator mounting portion and/or housing.

The mirror back plate, including the indicator mounting portion or display receiving portion, may be configured to orient the housing and indicator module at a predetermined angle so that light exiting the indicator module when the light source is activated is directed one of (a) generally away from the vehicle when the mirror assembly is mounted to the vehicle so as to be principally viewed by drivers of other vehicles and so as to be substantially not viewed by the driver of the host vehicle, and (b) generally toward the driver of the vehicle when the mirror assembly is mounted to the vehicle so as to be principally viewed by the driver of the host vehicle and so as to be substantially not viewed by drivers of other vehicles.

Optionally, the display or indicator element is associated with a blind spot detection system of the vehicle. Optionally, the display element is associated with a turn signal of the vehicle. Optionally, the display element may comprise first and second display elements, with a first display element being associated with a turn signal of the vehicle and a second display element being associated with a blind spot detection system of the vehicle.

The back plate may comprise a plastic molding, such as a plastic molding formed by injection molding or co-injection molding or the like. The back plate may be formed with an attaching portion, such as a raised annular ring or annular prongs or annular snaps or the like at its rear surface (opposite from the mounting face or surface that attaches to the mirror reflective element) for attaching the back plate to a mirror actuator (for manually or electrically adjusting an angle of the mirror reflective element relative to the mirror casing).

Therefore, the present invention provides a display device or indicator at the back plate of a mirror reflector sub-assembly. The mirror reflector sub-assembly thus may achieve enhanced assembly processes, and may be supplied or provided to a mirror manufacturer or assembler as a unit that includes the indicator mounting portion (and that may also include the indicator) and display. The integrally formed back plate and indicator mount or mounting portion may be readily attached to the mirror reflective element, and the indicator assembly or module may be readily plugged into or connected to or received in the indicator mount to assemble the mirror reflector sub-assembly. Electrical connection may be readily made to the electrical terminals of the indicator module via a suitable connector. The back plate may include one or more indicator mounts or mounting portions and associated light baffles for providing one or more displays at the reflective element, such as a blind spot/LCA display and/or a turn signal display and/or the like.

These and other objects, advantages, purposes and features of the present invention will become apparent upon review of the following specification in conjunction with the drawings.

BRIEF DESCRIPTION OF THE DRAWINGS

FIG. 7 is a sectional view of another back plate and indicator module construction of the present invention;

FIG. 7A is a schematic of the indicator module of FIG. 7, showing the reflection of light along the tube of the module;

FIG. 10 is a plan view of the indicator module of FIG. 9, shown mounted at a back plate of a mirror reflective element;

FIG. 11 is a sectional view of the indicator module and back plate and reflective element, taken along the line XI-XI in FIG. 10;

FIGS. 12A-C are elevations of an exemplary indicator module of the present invention;

FIG. 13 is an exploded perspective view of another indicator module and back plate of the present invention;

DESCRIPTION OF THE PREFERRED EMBODIMENTS

Figure 1:
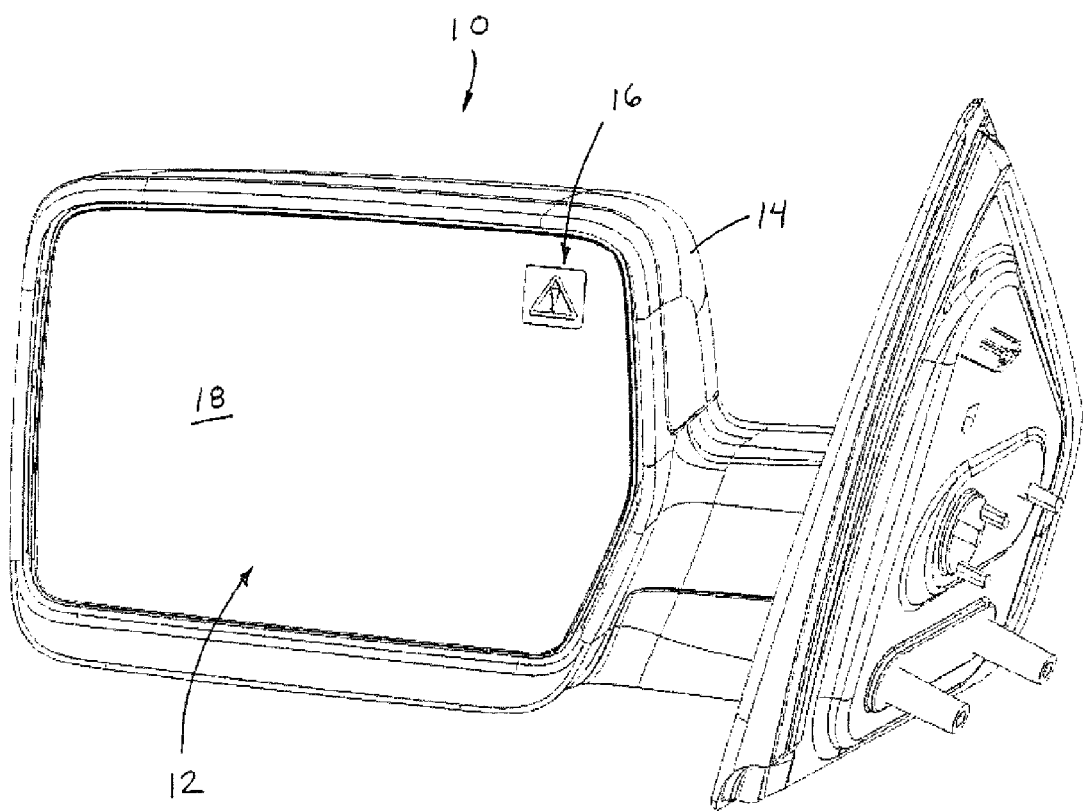
FIG. 1 is a view of an exterior mirror assembly with a an indicator or indicator module in accordance with the present invention, shown as viewed in the direction of travel of the vehicle.
Figure 2:
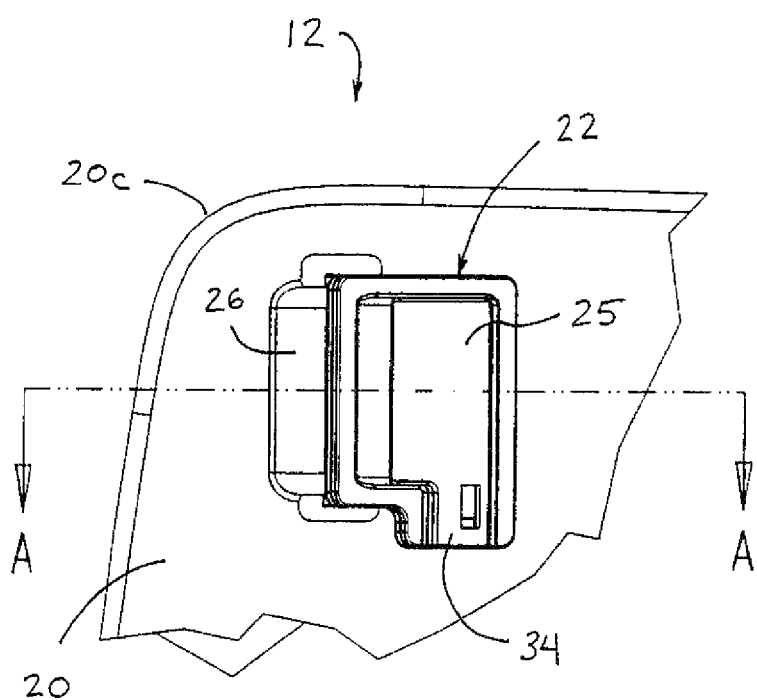
FIG. 2 is a plan view of an indicator module of the present invention, shown mounted at a back plate of a mirror reflective element.

Referring now to the drawings and the illustrative embodiments depicted therein, an exterior rearview mirror assembly 10 for a vehicle includes a mirror reflector sub-assembly 12 and a mirror shell or casing 14 (FIG. 1). Mirror assembly 10 is mounted at the side of a host or subject vehicle (not shown). As shown in FIG. 2, mirror reflector sub-assembly 12 includes a mirror reflective element 18 and a mirror reflector carrier or back plate 20 attached to or mounted to or adhered to a rear surface 18a of mirror reflective element 18. Mirror assembly 10 includes an indicator or display element or device or signal indication module 22 that is disposed at back plate 20 and behind reflective element 18, and that is operable to provide a display or indication 16 at the reflective element for viewing the display or indication through the mirror reflective element. Signal indication module 22 includes a housing 24 (that is received into or attached to an indicator receiving portion or mounting portion or structure 26 of back plate 20 so as to be disposed generally at a rear surface of a planar portion 20a of back plate 20) and an illumination source or indicator 28, such as one or more light emitting diodes (LEDs) or other suitable illumination source. In the illustrated embodiment, the mirror assembly includes a signal indication module 22 for an object detection in a blind spot detection system or LCA system (with the indicator module being angled and operated to provide a signal that is principally viewable by the driver of the vehicle), as discussed below, but could also or otherwise include a display device for a turn signal indicator or signal indication module or other indicator device (as also discussed below). The indicator element or signal indication module thus may be readily mounted to or attached to an indicator mounting portion of the back plate 20. The signal indication module and reflective element subassembly may utilize aspects of the indicators and reflective elements described in U.S. Pat. Nos. 7,038,577; 6,882,287; 6,198,409; 5,929,786; and 5,786,772, and/or U.S. patent applications, Ser. No. 11/520,193, filed Sep. 13, 2006; Ser. No. 11/226,628, filed Sep. 14, 2005; and/or Ser. No. 11/315,675, filed Dec. 22, 2005, and/or PCT Application No. PCT/US2006/026148, filed Jul. 5, 2006 and published Jan. 11, 2007 as International Publication No. WO 2007/005942, and/or PCT Application No. PCT/US2006/018567, filed May 15, 2006 and published Nov. 23, 2006 as International Publication No. WO 2006/124682, and/or PCT Application No. PCT/US07/82099, filed Oct. 23, 2007; and/or U.S. provisional application, Ser. No. 60/954,953, filed Aug. 9, 2007, which are all hereby incorporated herein by reference in their entireties.

Optionally, the mirror assembly may include multiple display elements or devices or signal indication modules (such as two or more display elements or devices or signal indication modules) for providing both an object in a blind spot/LCA indicator and display area and a turn signal indicator and display area. The two or more signal indication modules may be incorporated together into a single unitary display module or unit (and thus with a common connector incorporated in the single unitary module and servicing, for example, a commonly housed turn signal indicator element and blind spot indicator element), or the two or more signal indication modules may be separate display devices (for example, a LCA blind spot indicator unitary module may be disposed at a bottom/lower inward portion of the mirror sub-assembly and a separate turn signal indicator unitary module may be disposed at an upper outward portion of the mirror sub-assembly), while remaining within the spirit and scope of the present invention. Optionally, for example, a turn signal indicator or device or element or module of the present invention may be incorporated into a mirror sub-assembly, and the exterior rearview mirror assembly may include a blind spot or lane change assist indicating device or element at a portion of the mirror casing (such as at an inboard facing portion of the casing that faces generally inboard toward the side of the vehicle so as to be readily viewable by the driver of the vehicle), such as by utilizing aspects of the indicating elements described in PCT Application No. PCT/US2006/026148, filed Jul. 5, 2006 and published Jan. 11, 2007 as International Publication No. WO 2007/005942, which is hereby incorporated herein by reference in its entirety. Optionally, and desirably, the signal indication module 22 may be purchased as a display element assembly (including a circuit element and circuitry, which may be attached at the rear of the housing) and assembled to the mirror reflective element sub-assembly 12, such as at a mirror assembly facility.

Figure 3:
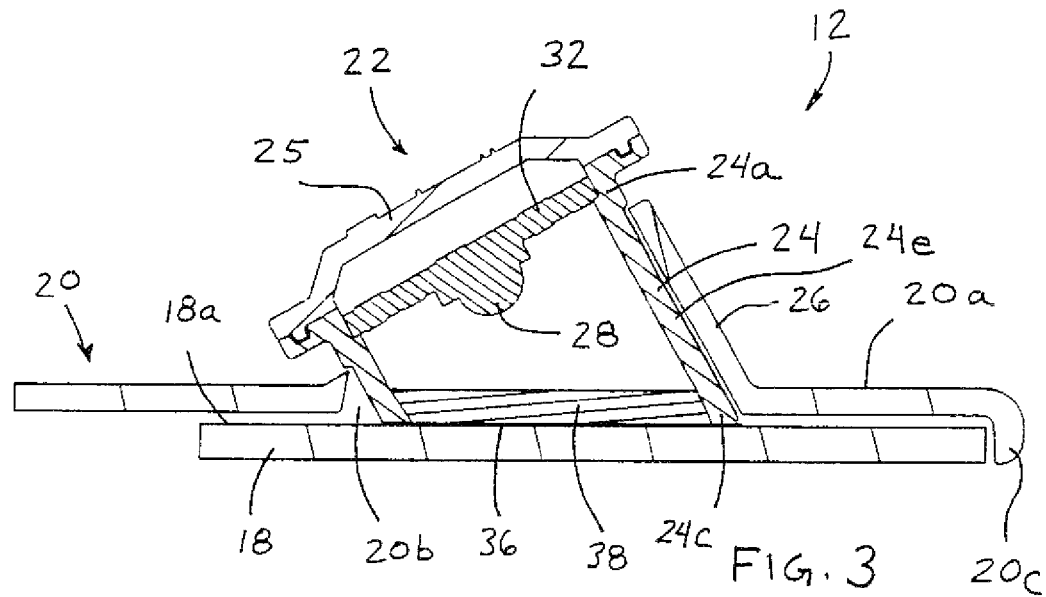
FIG. 3 is a sectional view of the indicator module and back plate and reflective element, taken along the line A-A in FIG. 2.
Figure 4:
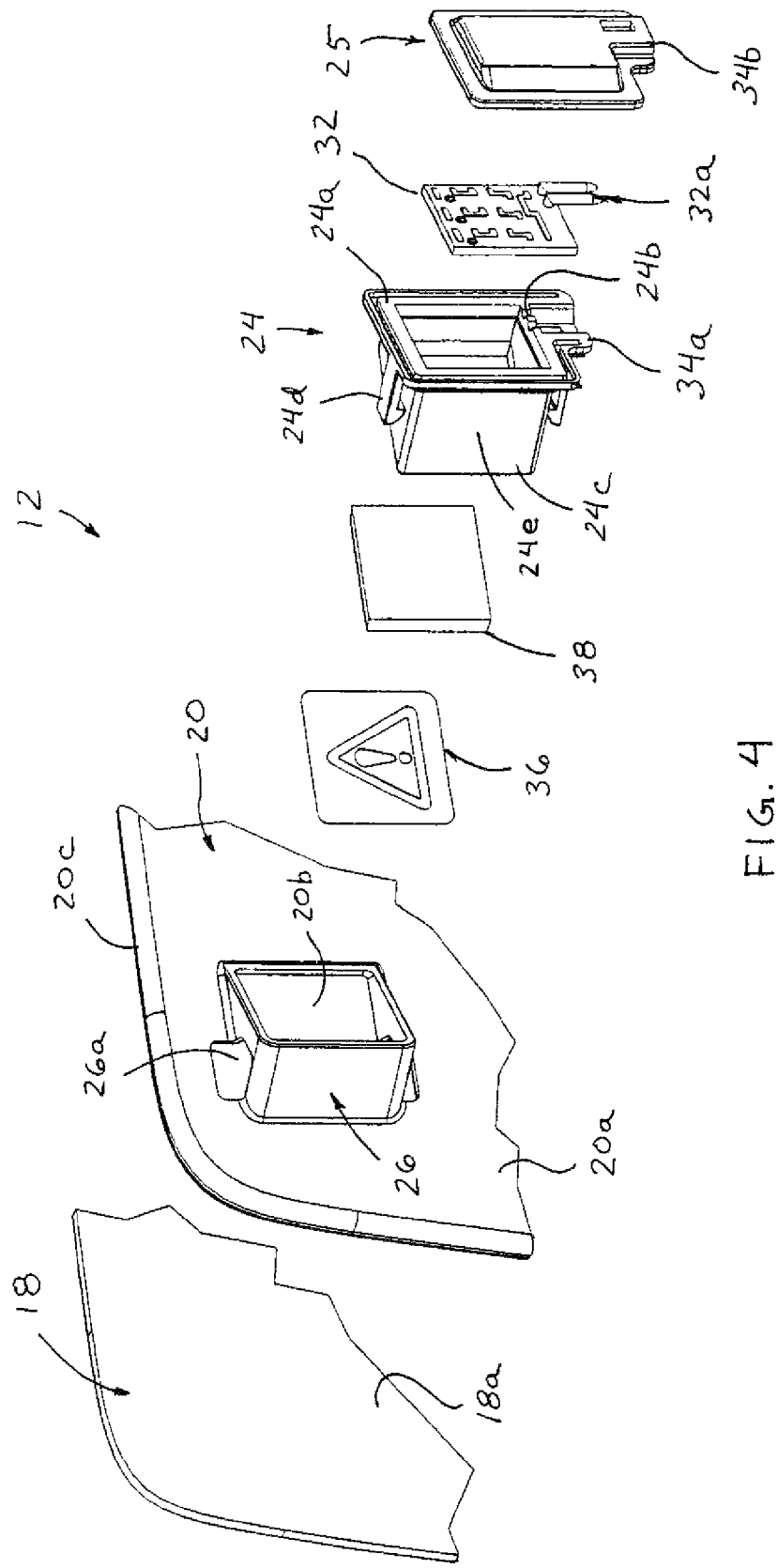
FIG. 4 is an exploded perspective view of an indicator module and back plate of the present invention.

As shown in FIGS. 3 and 4, signal indication module 22 includes a circuit element 32, such as a printed circuit board or the like (such as a rigid or flexible circuit board or element), with a single illumination source or LED 28 disposed thereat (such as surface mounted or otherwise disposed LED or other suitable or equivalent light source), although two or more illumination sources or LEDs may be provided while remaining within the spirit and scope of the present invention. Circuit element 32 is attachable at or positioned at a rear portion 24a of housing 24 (such as received at a pocket or receiving portion formed at the rear portion of the housing 24), whereby the illumination sources 28 are located at the rear portion of the housing and at an opposite end of the housing from the reflective element 18.

In the illustrated embodiment, signal indication module 22 includes housing 24 and a rear housing portion or cover element 25 that cooperate to substantially encase the circuit element 32 at the rear portion of the housing 24. For example, cover element 25 may snap or may be sealed or adhered or welded to the rear portion of the housing 24 to substantially seal circuit element 32 within the housing of the signal indication module. As can be seen in FIG. 4, circuit element 32 includes a pair of electrical terminals or leads 32*a* that are in electrical or conductive communication with illumination source 28 and that electrically connect the circuitry and light source to electrical power or electrical control at the mirror assembly when the signal indication module is attached to the back plate and installed at the mirror casing. In the illustrated embodiment, terminals 32*a* extend from circuit element 32 and through notches 24*b* formed at the rear portion 24*a* of the housing 24 and into and/or along a socket portion 34 formed by a socket portion 34*a* of housing 24 and a socket portion 34*b* of cover element 25. Socket portion 34 thus provides a socket for a plug or lead of the mirror assembly to readily connect to the signal indication module to provide power and/or control to the signal indication module when the module is mounted to or attached to the back plate and installed at the mirror casing.

Signal indication module 22 includes an icon element or indicia element 36 that may be disposed at a forward end region or portion 24*c* of housing 24 so as to be disposed at the rear of the reflective element when the signal indication module 22 is attached to the back plate 20. The indicia element is formed to provide the desired or appropriate icon for viewing by the driver of the vehicle (for a blind spot detection system application) when the indicia element is backlit by the illumination source 28. Optionally, the walls or surfaces 24*e* of housing 24 may comprise highly specularly and/or diffusely light reflecting inner surfaces so as to enhance diffuse reflection of incident light to enhance the intensity of illumination that exits the indicator module through the indicia element. For example, the diffuse wall may be molded of a white plastic material or resin, such as an ABS or an ABS/polycarbonate polymeric resin material or the like.

Optionally, and desirably, a diffuser element 38 is disposed at the rear of the indicia element 36 to diffuse the light emitted by the illumination source 28 to provide more uniform back lighting of the indicia element 36 when the illumination source is activated. The diffuser element 38 and indicia element 36 may be at least partially received in the front end portion of the housing 24 and may be attached and/or sealed thereto. The front end 24*c* of housing 24 is formed so as to position indicia element 36 at and preferably against the rear surface of the reflective element 18 when the module 22 is attached to the back plate 20.

Back plate 20 is molded or formed, such as by injection molding, so as to provide the display receiving portion 26 and a generally planar backing portion 20*a* that attaches to the rear surface of the reflective element 18 (such as via adhesive or other suitable attachment means). As shown in FIG. 3, back plate 20 includes an aperture 20*b* at mounting portion 26 such that when signal indication module 22 is attached to mounting portion 26 of back plate 20, the front end of housing 24 and the indicia element 36 of signal indication module 22 are positioned through the aperture and at or against the rear surface of the reflective element substrate. Preferably, back plate 20, including display receiving portion 26, is molded of a substantially dark or opaque or black material, such as from an ABS or polycarbonate polymeric resin material or from any other suitable material such as known in the exterior rearview mirror art, so as to be substantially opaque such that light does not pass through the opaque back plate and the indicator mounting portion.

As shown in FIGS. 3 and 4, indicator mounting portion 26 is unitarily or integrally formed with back plate 20 and may be formed with a pocket for receiving or partially receiving housing 24 to locate signal indication module 22 at the generally planar backing portion 20*a* of back plate 20. For example, the pocket may receive housing 24 at least partially therein, and the indicator mounting portion 26 may secure (such as by snapping or the like) the housing at or in the pocket of the indicator mounting portion 26 of back plate 20 (such as via tabs 24*d* on housing 24 engaging slots or apertures 26*a* of mounting portion 26 to snap the signal indication module 22 to the back plate with the forward end of the housing and the indicia element urged toward and against the rear surface of the reflective element).

Optionally, the back plate may include a perimeter framing portion or bezel portion 20*c* that extends around the perimeter edges of the reflective element to support the reflective element and frame the reflective element at the mirror assembly (such as by utilizing aspects of the mirror assemblies described in U.S. patent application Ser. No. 11/520,193, filed Sep. 13, 2006, and/or PCT Application No. PCT/US07/82099, filed Oct. 23, 2007, which are hereby incorporated herein by reference in their entireties). The perimeter bezel portion may be narrow or small depending on the particular application of the reflective element and mirror reflector sub-assembly. Optionally, the mirror reflector sub-assembly may comprise a bezeless or frameless reflective element (such as the types described in U.S. patent applications, Ser. No., 11/226,628, filed Sep. 14, 2005; Ser. No. 10/533,762, filed May 4, 2005, now U.S. Pat. No. 7,184,190; and/or Ser. No. 11/021,065, filed Dec. 23, 2004, now U.S. Pat. No. 7,255,451, and/or PCT Application No. PCT/US2006/018567, filed May 15, 2006 by Donnelly Corp. et al., and published Nov. 23, 2006 as International Publication No. WO 2006/124682, which are hereby incorporated herein by reference in their entireties), whereby the back plate may not include a perimeter framing portion or bezel portion around the perimeter of the reflective element.

Back plate 20 may include an attachment element or elements (such as an annular ring or tab or annular prongs or annular snaps or the like) formed or established at the rear of the backing portion 20*a* for attaching the back plate 20 and reflective element 18 to a mirror actuator (such as a mirror actuator as known in the art and/or as described in U.S. Pat. Nos. 7,080,914; 7,073,914; 6,916,100; 6,755,544; 6,685,864; 6,467,920; 6,362,548; 6,243,218; 6,229,226; 6,213,612; 5,986,364 and 5,900,999, which are hereby incorporated herein by reference herein in their entireties), which is adjustable or operable to adjust a viewing angle of mirror reflective element 18. When the mirror reflective element is canted or angled partially toward the driver of the host vehicle (which is typically the orientation of the reflective element during use so as to provide a generally rearward field of view to the driver of the host vehicle), there is sufficient space within the mirror casing at or near the outboard portion of the mirror assembly for the indicator mounting portion and signal indication module. The back plate and signal indication module of the present invention thus utilizes the space within the mirror head or casing that is already available and typically not used or occupied by other components.

Illumination source or sources 28 is/are operable or activatable or energizable to provide illumination at and through or along housing 24, whereby the illumination is transmitted along housing 24 and through the diffusing element 38 and indicia element 36 and through the aperture in back plate 20 and through the reflective element 18 so as to be viewable through mirror reflective element 18 by a person viewing the mirror assembly 10. The signal indication module 22 may comprise a blind spot or object detection indicating device or module that is operable to indicate to the driver of the subject or host vehicle that an object or other vehicle is detected at the side or blind spot region of the host vehicle by a blind spot detection system, or may comprise a turn signal indicating device or module that is operable to indicate to the driver or passenger of another vehicle that the vehicle is turning or changing lanes, or may comprise other forms or types of display or illumination or indicating devices or modules, while remaining within the spirit and scope of the present invention.

Illumination source 28 is/are energized to direct or emit illumination along housing 24 so that the indicator/light is viewable through the reflective element. The illumination source 28 may comprise any suitable illumination source or light source. For example, the illumination source may comprise one or more light emitting diodes (LEDs) or organic light emitting diodes (OLEDs) or the like, or may comprise one or more power LEDs, such as of the types described in U.S. Pat. No. 7,195,381, which is hereby incorporated herein by reference in its entirety, or may comprise a LUXEON® LED available from LUMILEDS™ or other suitable light source.

The back plate and/or signal indication module may be formed to provide a desired shape for viewing of the light passing through the reflective element or the mirror reflective element may include one or more iconistic display areas so that the illumination is viewable and discernible at the reflective element by the desired or targeted viewer. The mirror assembly thus may provide an iconistic display for an object detection/LCA system and/or an iconistic display for a turn signal indication, and/or may provide other displays or illumination devices, without affecting the scope of the present invention.

The indicator mounting portion may be angled so as to direct the light toward the vehicle and toward a driver or occupant of the host vehicle. More particularly, the light beam emitted from the blind spot signal indicating module and transmitted through the reflective element is angled so as to have its principle beam axis directed generally toward the eyes of a driver seated in the interior cabin of the host vehicle. The indicator mounting portion thus may extend from the rear of the back plate at an acute angle (such as approximately about 25 to about 30 degrees or thereabouts) relative to the plane defined by the back plate so as to direct or guide light through the passageway and in the desired direction toward the side of the equipped/host vehicle for viewing the object/LCA indication principally or solely by the driver of the host vehicle. Should, however, the signal module be a turn signal module, then the indicator mounting portion may extend from the rear of the back plate at an acute angle (such as approximately about 55 to about 60 degrees or thereabouts) relative to the plane defined by the back plate so as to direct or guide light through the passageway and in the desired direction away from the side of the equipped/host vehicle for viewing the turn indication principally or solely by the drivers of overtaking vehicles and principally other than by the driver of the host vehicle.

Optionally, it is envisioned that the signal indication module may be formed at an angle that is suitable for either application (blind spot alert and turn signal indication), such as about 30 degrees or thereabouts relative to the rear surface of the mirror substrate. With such a construction, a common module may be used for either application by flipping the module or reversing the module so that in one position, the module is angled so as to direct illumination toward the driver of the subject vehicle and in the other position, the module is angled so as to direct illumination toward drivers of other vehicles approaching or overtaking the subject vehicle. The indicia element 36 may be reversed as well (depending on the icon or indicia established thereon) or may be selected and added for the particular application (for example, a warning icon may be provided on modules adapted for use as a blind spot alert while a chevron symbol or the like may be provided on modules adapted for use as a turn signal indicator). Thus, the different modules may have common molded housings and cover elements and circuitry, and thus may be readily manufactured and supplied for the particular applications of the vehicles.

Preferably, the mirror reflective element 18 comprises a transflective display on demand reflective element that is partially transmissive and partially reflective, so that the light emanating from the signal indication module may be transmitted through the reflective element when the illumination source is activated, but the indicator module is substantially non-visible or viewable when the illumination source is deactivated. Optionally, the mirror reflective element 18 may comprise a single substrate or non-electro-optic reflective element (such as shown in FIG. 3), which has a glass substrate with a transflector coating or layer at its forward surface. Optionally, the reflective element may comprise an electro-optic, such as electrochromic, reflective element, such as discussed below.

Optionally, a heater pad may be provided at the rear surface of the glass substrate of reflective element and between the backing portion 20a of back plate 20 and the reflective element 18 to provide an anti-fogging of de-fogging feature to the exterior mirror assembly (such as by utilizing aspects of the heater elements or pads described in U.S. patent application Ser. No. 11/334,139, filed Jan. 18, 2006 by Byers et al. for MIRROR ASSEMBLY WITH HEATER ELEMENT, now U.S. Pat. No. 7,400,435, which is hereby incorporated herein by reference in its entirety). The back plate and/or heater pad may include suitable electrical connectors and connections incorporated therein (such as by utilizing aspects of the mirror assembly described in U.S. patent application Ser. No. 11/334,139, filed Jan. 18, 2006 by Byers et al. for MIRROR ASSEMBLY WITH HEATER ELEMENT, now U.S. Pat. No. 7,400,435, which is hereby incorporated herein by reference in its entirety) for electrically connecting the heater pad and/or display element (or other suitable electrical connectors may be utilized, such as electrical leads or wire harnesses or pigtails or other separate connectors or cables or the like). The heater pad may include a hole or opening or aperture therethrough (or optionally a window or transparent or translucent or diffuse portion of the heater pad, such as a clear or diffusing transparent polyester flexible plastic film or element) that generally corresponds to the aperture 20b of back plate 20 when the heater pad is attached to the rear surface of the glass substrate of reflective element 18 and when the back plate 20 is attached to the rear surface of the heater pad. Optionally, and desirably, the heater pad may include an adhesive layer (such as a pressure sensitive adhesive layer) at its rear surface for adhering the back plate to the heater pad and thus to the rear surface of the glass substrate of the reflective element 18.

Optionally, and preferably, indicator element or display element or signal indication module 22 may snap into the end or pocket of the indicator mounting portion 26 or may otherwise be attached or stuck at the indicator mounting portion, and may have a gasket or seal at the signal indication module to provide a substantially water proof or water resistant or water tight seal at the signal indication module, whereby the signal indication module may be sealed at the indicator mounting portion, such as by gluing or pressing or screwing or gasketing or hermetically sealing or otherwise substantially sealing the signal indication module at the indicator mounting portion. The signal indication module may comprise a self-contained, unitary, sealed or substantially sealed, indicator module that includes the housing and cover element, an illumination source (such as one or more LEDs or the like), a DC converter with a voltage dropping resistor (such as described in U.S. Pat. Nos. 6,902,284 and 6,690,268 and/or U.S. patent application Ser. No. 10/054,633, filed Jan. 22, 2002 by Lynam et al. for VEHICULAR LIGHTING SYSTEM, now U.S. Pat. No. 7,195,381, which are hereby incorporated herein by reference in their entireties) and the electrical terminals or connector. The signal indication module thus may be connected to a power source and may be activated or energized to illuminate the display for viewing by the driver of the vehicle. Optionally, the electrical connections to the signal indication module may be made while the signal indication module is attached to the mirror assembly, such as via a plug and socket type arrangement or configuration, and such as by utilizing aspects of the mirror assembly described in U.S. Pat. No. 6,669,267, which is hereby incorporated herein by reference in its entirety. The unitary signal indication module may include or utilize aspects of various light modules or systems or devices, such as the types described in U.S. Pat. Nos. 6,227,689; 6,582,109; 5,371,659; 5,497,306; 5,669,699; 5,823,654; 6,176,602; and/or 6,276,821, and/or U.S. patent application Ser. No. 11/520,193, filed Sep. 13, 2006, and/or PCT Application No. PCT/US2006/018567, filed May 16, 2006 and published Nov. 23, 2006 as International Publication No. WO 2006/124682, which are hereby incorporated herein by reference in their entireties.

Optionally, the signal indication module may be supplied or provided to an assembly facility (such as a mirror assembly facility or the like) from a module supplier while the back plate may be supplied or provided to the assembly facility from a back plate supplier. An operator at the assembly facility may attach the module to the back plate, preferably by snapping or pressing the module to the back plate to assemble the module to the back plate (whereby the module may have a snug fit within the receiving portion or pocket such that the module and back plate are preferably substantially water impervious). Optionally, and desirably, electrical connection (such as to a power supply or 12 volt power wire of the vehicle battery/ignition system or to a power feed from a LIN bus controller) to the module may be made when the module is snapped or otherwise attached (preferably mechanically but optionally adhesively) to the back plate (such as by making electrical contact between the module and mirror circuitry [including circuitry associated with the reflective element and/or mirror assembly, such as electrochromic mirror circuitry, mirror lights and display circuitry and the like, typically disposed at a printed circuit board of the mirror assembly] when the module is snapped to the back plate, such as by press attaching the display module into receiving fingers or clips or snaps or the like that are integrally formed with the back plate in the injection molding operation that manufactures or forms the back plate itself) or alternately, electrical connection to the module may be made via other means, such as wires or leads or the like before or after the module is snapped or attached to the back plate.

Figure 9:
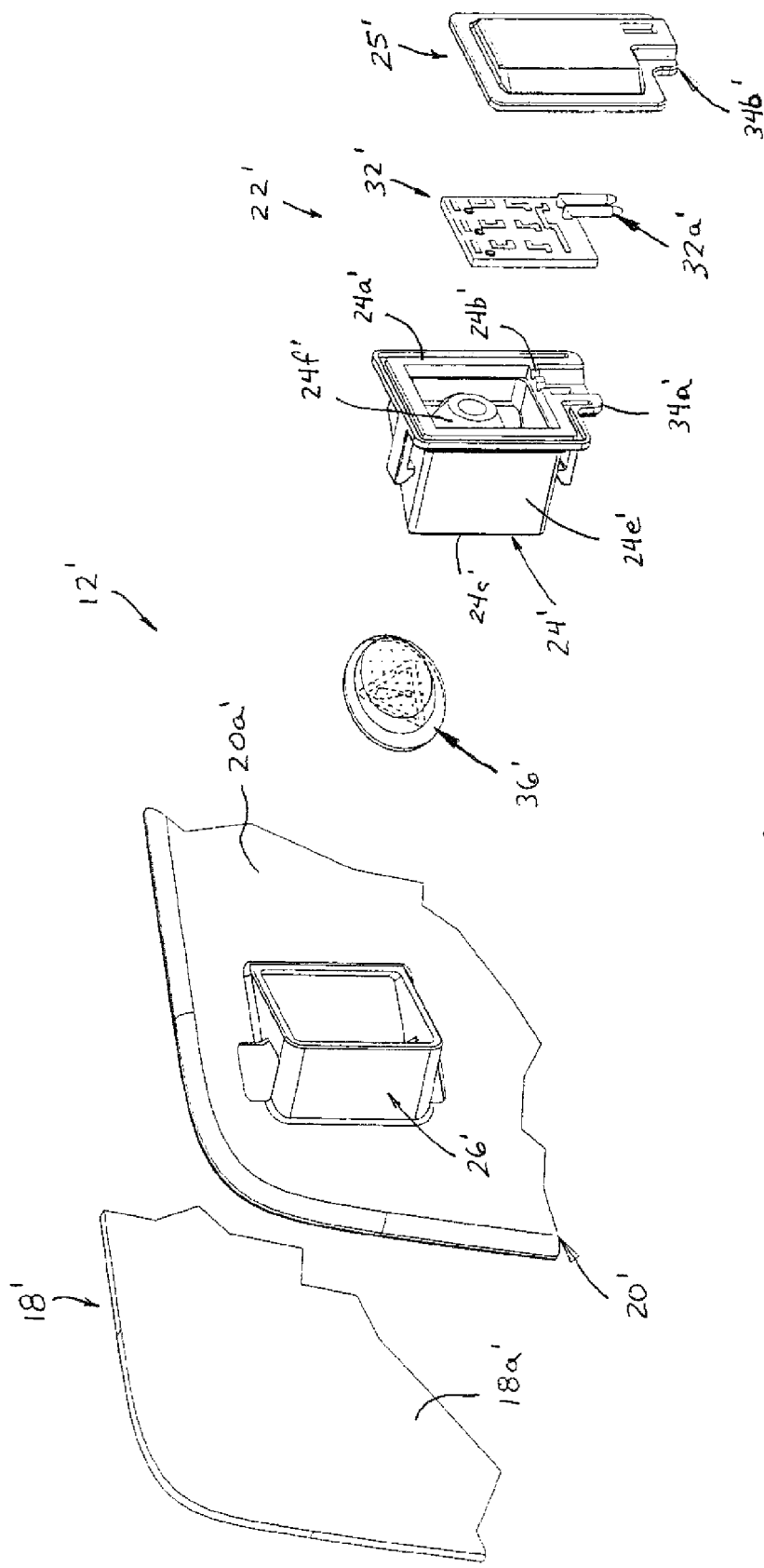
FIG. 9 is an exploded perspective view of another indicator module and back plate of the present invention.

Optionally, and with reference to FIGS. 9-11, a mirror reflector sub-assembly 12' for an exterior vehicular mirror includes a mirror reflective element 18' and a mirror reflector carrier or back plate 20' attached to or mounted to or adhered to a rear surface 18a' of mirror reflective element 18'. The mirror reflector sub-assembly 12' includes an indicator or display element or device or signal indication module 22' that is disposed at back plate 20' and behind reflective element 18', and that is operable to provide a display or indication at the reflective element for viewing the display or indication through the mirror reflective element, such as in a similar manner as described above with respect to signal indication module 22. Signal indication module 22' includes a housing 24' (that is received into or attached to an indicator receiving portion or mounting portion or structure 26' of back plate 20' so as to be disposed generally at a rear surface of a planar portion 20a' of back plate 20') and an illumination source or indicator 28', such as one or more light emitting diodes (LEDs) or other suitable illumination source. In the illustrated embodiment, the mirror assembly includes a signal indication module 22' for an object detection in a blind spot detection system or LCA system (with the indicator module being angled and operated to provide a signal that is principally viewable by the driver of the vehicle), but could also or otherwise include a display device for a turn signal indicator or signal indication module or other indicator device (as also discussed below). The indicator element or signal indication module thus may be readily mounted to or attached to an indicator mounting portion of the back plate 20', such as discussed above.

Signal indicator module 22' may be substantially similar to signal indicator module 22, discussed above, such that a detailed discussion of the signal indicator modules need not be repeated herein. As shown in FIG. 9, signal indication module 22' includes housing 24' and a rear housing portion or cover element 25' that cooperate to substantially encase the circuit element 32' at the rear portion of the housing 24'. As can be seen in FIG. 9, circuit element 32' includes a pair of electrical terminals or leads 32a' that are in electrical or conductive communication with illumination source 28' and that electrically connect the circuitry and light source to electrical power or electrical control at the mirror assembly when the signal indication module is attached to the back plate and installed at the mirror casing. In the illustrated embodiment, terminals 32a' extend from circuit element 32' and through notches 24b' formed at the rear portion 24a' of the housing 24' and into and/or along a socket portion 34' formed by a socket portion 34a' of housing 24' and a socket portion 34b' of cover element 25'. Socket portion 34' thus provides a socket for a plug or lead of the mirror assembly to readily connect to the signal indication module to provide power and/or control to the signal indication module when the module is mounted to or attached to the back plate and installed at the mirror casing.

Signal indication module 22' includes an icon element or indicia element 36' that may be disposed at a forward end region or portion 24b' of housing 24' so as to be disposed to the rear of the reflective element when the signal indication module 22' is attached to the back plate 20'. The indicia element is formed to provide the desired or appropriate icon for viewing by the driver of the vehicle (such as, for example, for a blind spot detection system application) when the indicia element is backlit by the illumination source 28'. Optionally, and desirably, a light diffusing element may be disposed in front of or at the rear of the indicia element 36' (and may be a separate element or substrate or film or may be integral with the indicia element) to further diffuse light emitted by the illumination source 28' passing therethrough, in order to provide enhanced uniformity of back lighting of the indicia element 36' when the illumination source is activated. The indicia element 36' may be at least partially received in the front end portion of the housing 24' and may be attached and/or sealed thereto. The front end 24c' of housing 24' is formed so as to position indicia element 36' at and preferably against the rear surface of the reflective element 18' when the module 22' is attached to the back plate 20'.

In the illustrated embodiment, indicia element 36' and/or the diffuser element comprise a circular element that is disposed at the front end portion of housing 24'. Housing 24' includes an outer wall 24e' that supports and/or receives the circuit element 32' and cover element 25' at its rearward end and an inner wall or guide wall 24f'. As can be seen in FIGS. 9 and 11, inner wall 24f' has a rearward end that receives or aligns with the illumination source or sources of circuit element 32' and a forward end that receives or aligns with the indicia element 36'. Inner wall 24f' is a conical-shaped wall and is angled, (as shown in FIG. 11) so as to direct light emitted by the illumination source toward and through the indicia element 36'. The indicia element may provide any suitable alert or indicator, such as a triangular-shaped alert or an exclamation point alert (or an exclamation point within a triangular-shaped border as shown in the illustrated embodiment) or the like for a blind spot indicator system (or other suitable alert or indicator for other applications, such as an arrow head or chevron icon or the like for turn signal indicator applications), that is viewable and discernible and understandable by the person viewing the indicia at the reflective element of the exterior rearview mirror assembly.

The conical-shaped inner wall 24f' of housing 24' is angled so as to guide the illumination in the desired direction, such as toward the side of the vehicle for a blind spot indicator application (or away from the side of the vehicle for a turn signal indicator application or the like). Preferably, the inner wall or surfaces 24f' is highly specularly and/or diffusely light reflecting so as to enhance diffuse reflection of incident light to enhance the intensity of illumination that exits the indicator module through the indicia element. Preferably, the diffuse wall is molded of a white plastic material or resin, such as an ABS or an ABS/polycarbonate polymeric resin material or the like.

Optionally, and as discussed above, the signal indication module may be supplied or provided to an assembly facility (such as a mirror assembly facility or the like) from a module supplier, while the back plate may be supplied or provided to the assembly facility from a back plate supplier. An operator or operators at the assembly facility may attach or adhere the back plate (which may include a heater pad disposed thereat or the operator may attach or adhere a heater pad to the back plate and/or reflective element) to the rear surface of the reflective element, and the signal indicator module may be attached to the back plate, preferably by snapping or pressing the module to the back plate to assemble the module to the back plate (whereby the module may have a snug fit within the receiving portion or pocket such that the module and back plate are preferably substantially water impervious). Optionally, and desirably, electrical connection to the signal indicator module may be made when the module is snapped or otherwise attached (preferably mechanically but optionally adhesively) to the back plate, such as by making electrical contact between the module and mirror circuitry (such as circuitry associated with the reflective element and/or mirror assembly, such as electrochromic mirror circuitry, mirror lights and display circuitry and the like, typically disposed at a printed circuit board of the mirror assembly) when the module is snapped to or attached to the back plate, such as by press attaching the signal indicator module into receiving fingers or clips or snaps or the like that are integrally formed with the back plate in the injection molding operation that manufactures or forms the back plate itself, or alternately, electrical connection to the module may be made via other means, such as wires or leads or the like before or after the module is snapped or attached to the back plate.

With reference to FIGS. 12A-C, the indicator module may be approximately 28 mm by about 36.3 mm, with a height or depth of about 20.1 mm. The outer walls of the housing may be generally rectangular-shaped and may be approximately 24 mm wide by 21 mm wide. In the illustrated embodiment, the rearward end of the housing is angled at approximately 30 degrees so as to angle or cant the circuit element at that angle to emit the illumination in the desired angle, such as generally rearward and toward the side of the vehicle for viewing by the driver of the vehicle (for blind spot indicator applications) or generally rearward and away from the side of the vehicle for viewing by drivers of other vehicles (for turn signal indicator applications). The exemplary embodiment of FIGS. 12A-C is provided to show an example of the dimensions of the signal indicator module of the present invention, but dimensions may be implemented without affecting the scope of the present invention.

Figure 15:
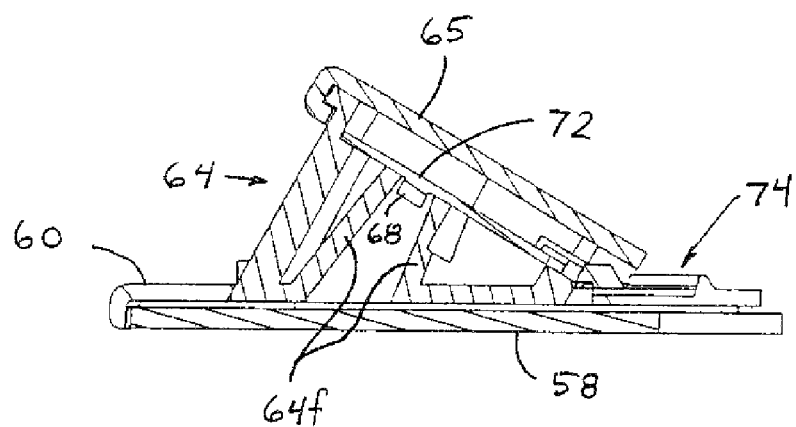
FIG. 15 is a sectional view of the indicator module and back plate and reflective element, taken along the line XV-XV in FIG. 14.
Figure 14:
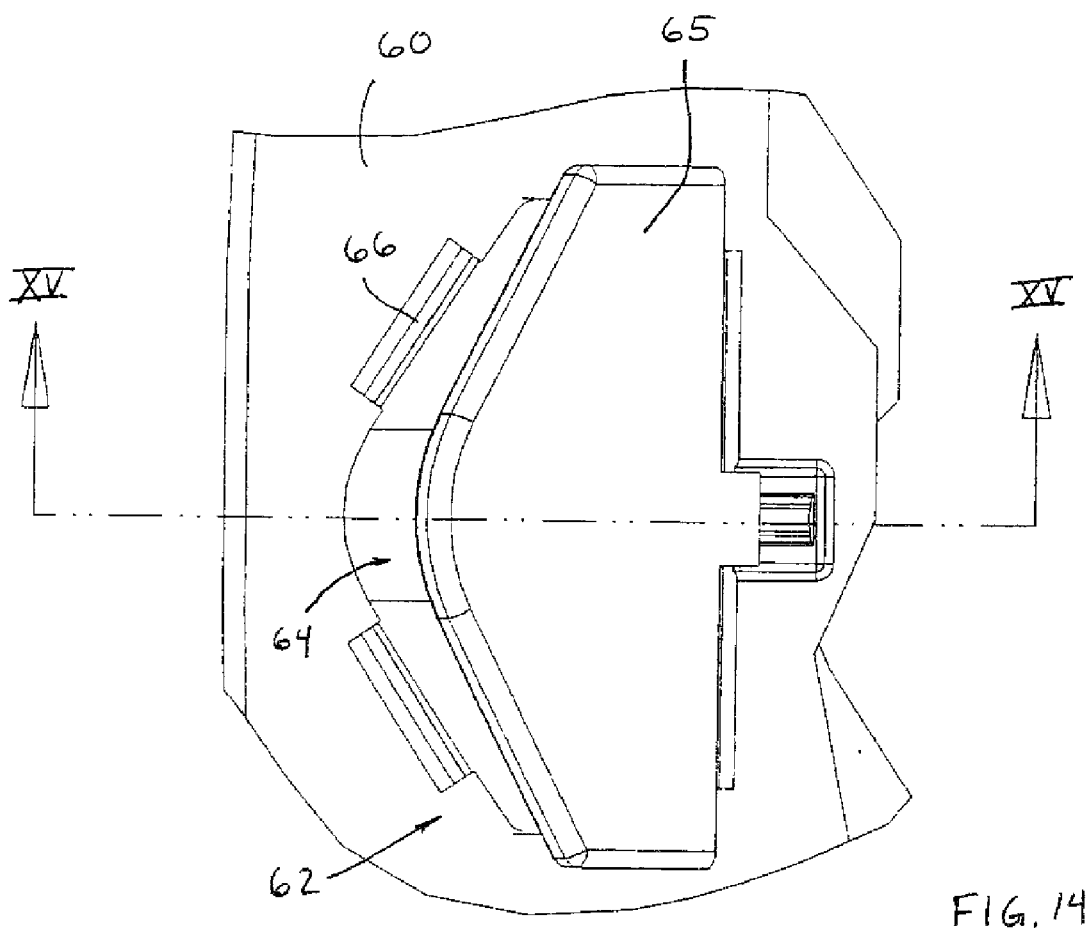
FIG. 14 is a plan view of the indicator module of FIG. 13, shown mounted at a back plate of a mirror reflective element.

Optionally, and with reference to FIGS. 13-15, a mirror reflector sub-assembly 52 for an exterior vehicular mirror includes a mirror reflective element 58 and a mirror reflector carrier or back plate 60 attached to or mounted to or adhered to a rear surface 58a of mirror reflective element 58, with an indicator or display element or device or signal indication module 62 that is disposed at back plate 60 and behind reflective element 58, and that is operable to provide a display or indication at the reflective element for viewing the display or indication through the mirror reflective element, such as in a similar manner as described above with respect to signal indication modules 22, 22'.

Signal indication module 62 includes a housing 64 (that is received into or attached to an indicator receiving portion or mounting portion or structure 66 of back plate 60 so as to be disposed generally at a rear surface of a planar portion 60a of back plate 60) and an illumination source or indicator 68, such as one or more light emitting diodes (LEDs) or other suitable illumination source on a circuit element 72, such as a printed circuit board or substrate or the like. In the illustrated embodiment, the mirror assembly includes a signal indication module 62 for a turn signal indicator or signal indication module, but could also or otherwise include a display device for an object detection in a blind spot detection system or LCA system (with the indicator module being angled and operated to provide a signal that is principally viewable by the driver of the vehicle) or other indicator device.

In the illustrated embodiment, housing 64 includes a plurality of apertures or passageways 64g therethrough that are defined by inner walls or surfaces 64f, which may comprise conical-shaped angled walls or surfaces to align with the respective illumination sources of the circuit element and to direct or guide the emitted light toward and through the reflective element at the forward end of the housing. As can be seen in FIG. 15, the passageways 64g may receive the respective illumination source 68 at their rearward ends and may guide the emitted illumination toward and through the reflective element at the forward end of the housing 64, such as in a similar manner as described above. Optionally, the signal indicator module may include an indicia element and/or a diffusing element at the forward end of the housing and between the housing and the rear surface of the reflective element, depending on the particular application of the signal indicator module and the desired display or indicia or pattern to be viewed at the mirror assembly.

Optionally, and desirably, the circuit element 72 may include a pair of electrical terminals or leads 72a that are in electrical or conductive communication with illumination sources 68 and that electrically connect the circuitry and light sources to electrical power or electrical control at the mirror assembly when the signal indication module is attached to the back plate and installed at the mirror casing. In the illustrated embodiment, terminals 72a extend from circuit element 72 and through a notch or notches 65a formed at the rear cover 65 and extend outward for electrical connection to a socket portion or electrical connector 74 at the back plate 60. The socket portion 64 thus may provide a socket for a plug or lead of the mirror assembly to readily connect to the signal indication module to provide power and/or control to the signal indication module when the module is mounted to or attached to the back plate and installed at the mirror casing.

Optionally, and as discussed above, the signal indication module may be supplied or provided to an assembly facility (such as a mirror assembly facility or the like) from a module supplier, while the back plate may be supplied or provided to the assembly facility from a back plate supplier, and an operator or operators at the assembly facility may attach or adhere the back plate (which may include a heater pad disposed thereat or the operator may attach or adhere a heater pad to the back plate and/or reflective element) to the rear surface of the reflective element, and the signal indicator module may be attached to the back plate, preferably by snapping or pressing the module to the back plate to assemble the module to the back plate (whereby the module may have a snug fit within the receiving portion or pocket such that the module and back plate are preferably substantially water impervious). Optionally, and desirably, electrical connection to the signal indicator module may be made when the module is snapped or otherwise attached (preferably mechanically but optionally adhesively) to the back plate, such as in a similar manner as described above.

Figure 16:
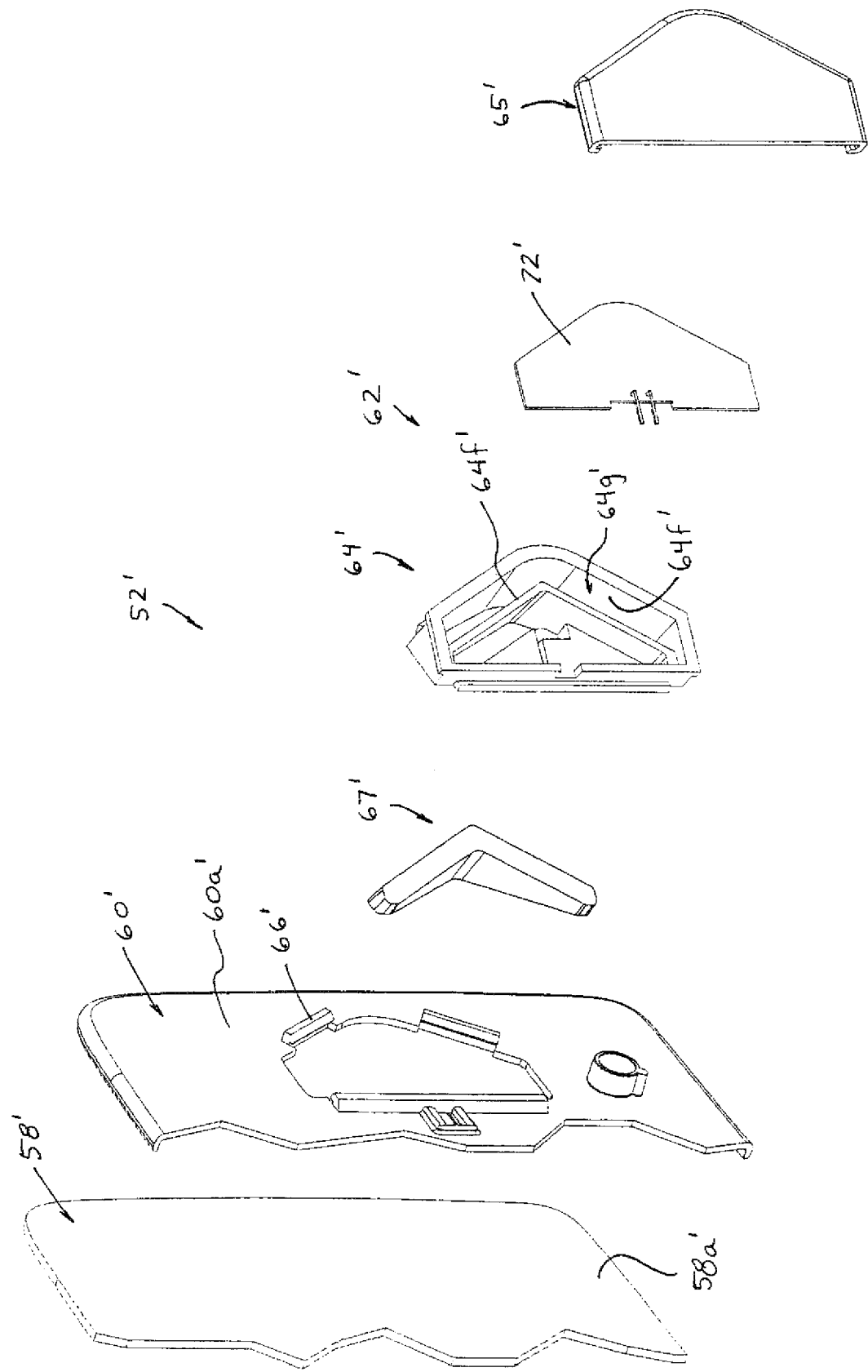
FIG. 16 is an exploded perspective view of another indicator module and back plate of the present invention.

Optionally, and with reference to FIG. 16, a mirror reflector sub-assembly 52' for an exterior vehicular mirror includes a mirror reflective element 58' and a mirror reflector carrier or back plate 60' attached to or mounted to or adhered to a rear surface 58a' of mirror reflective element 58', with an indicator or display element or device or signal indication module 62' that is disposed at back plate 60' and behind reflective element 58', and that is operable to provide a display or indication at the reflective element for viewing the display or indication through the mirror reflective element, such as in a similar manner as described above.

Signal indication module 62' includes a housing 64' (that is received into or attached to an indicator receiving portion or mounting portion or structure 66' of back plate 60' so as to be disposed generally at a rear surface of a planar portion 60a' of back plate 60') and a rear cover element 65' and an illumination source or indicator, such as one or more light emitting diodes (LEDs) or other suitable illumination source on a circuit element 72', such as a printed circuit board or substrate or the like, disposed and sealed within housing 64' and cover element 65'. In the illustrated embodiment, the mirror assembly includes a signal indication module 62' for a turn signal indicator or signal indication module, but could also or otherwise include a display device for an object detection in a blind spot detection system or LCA system (with the indicator module being angled and operated to provide a signal that is principally viewable by the driver of the vehicle) or other indicator device.

In the illustrated embodiment, the housing 64' provides an inner wall 64f that defines a passageway 64g' therethrough. A diffuse glow bar or block or element 67' (such as an arrow head-shaped element or chevron-shaped element or the like for turn signal indicator applications) is received within or at passageway 64g' so that light emitted by the illumination source or sources of the circuit element 72' passes through the glow element 67', whereby the glow element provides a generally uniformly illuminated element for viewing through the reflective element. The glow element may comprise a translucent or diffuse element, such as a diffuse acrylic element or the like, and/or may utilize aspects of the glow blocks or elements described in PCT Application No. PCT/US2006/018567, filed May 15, 2006 and published Nov. 23, 2006 as International Publication No. WO 2006/124682, and/or PCT Application No. PCT/US07/82099, filed Oct. 23, 2007, which are hereby incorporated herein by reference in their entireties.

Glow element 67' thus is a light transmitting and light diffusing element (such as may be formed from a light diffusing acrylic or polycarbonate molding), which may be rendered diffuse, such as by roughening or stippling of at least a portion of or all of the exterior surface of the block or element, or may be rendered diffuse during the molding or forming of the block or element, such as by utilizing crystalline materials or other light scattering effects or techniques in the molding (such that the light diffusing properties or characteristics of the glow element are created intrinsically). Optionally, glow element 67' may have its side walls diffusely light reflecting or specularly light reflecting and/or the inner wall or walls 64f' of the housing 64' may be diffusely or specularly light reflecting so that light rays that may otherwise be absorbed by the housing will reflect or bounce back and pass through the glow block or element and out through reflective element.

Optionally, the glow element may have a varying thickness (as can be seen in FIG. 16, the center region of the element is thicker than the outer or end regions of the element), and the circuit element may be a generally planar substrate or may be a flexible substrate (such as by disposing the LEDs on a flexible polymer printed circuit film or on a thin metal flexible printed metallic film or circuit) or a bent substrate or element, in order to dispose or locate or provide the illumination sources at about the same distance from (or generally uniformly at) the rear surface of the glow element. In applications where some of the illumination sources (such as the illumination sources at or near the outer ends of the glow element) are closer to the reflective element, the signal indicator module may provide non-uniform flooding of the glow element. In the illustrated embodiment, the glow element has a generally planar base or forward surface and an angled rear surface. The glow element may be disposed so that its generally planar forward surface is at or near or opposed to the rear surface of the reflective element, while the angled rear surface is angled relative to the rear surface of the reflective element. The circuit element may be located or disposed at the angled rear surface of the glow element and may be angled or bent or formed so that the LEDs are positioned generally at or near the angled rear surface of the glow element. The varying thickness of the glow element (being thicker at its central region and thinner at or toward its end regions) thus may compensate for the position of the LEDs relative to the glass of the reflective element to provide enhanced uniformity of the light passing through the glow element and the reflective element. Optionally, enhanced uniformity of light passing through the glow element and the reflective element may be accomplished by driving the LEDs at a different current or intensity, depending on the location of the individual LEDs at or along the angled or varying thickness glow element.

Optionally, and as discussed above, the signal indication module may be supplied or provided to an assembly facility (such as a mirror assembly facility or the like) from a module supplier, while the back plate may be supplied or provided to the assembly facility from a back plate supplier, and an operator or operators at the assembly facility may attach or adhere the back plate (which may include a heater pad disposed thereat or the operator may attach or adhere a heater pad to the back plate and/or reflective element) to the rear surface of the reflective element, and the signal indicator module may be attached to the back plate, preferably by snapping or pressing the module to the back plate to assemble the module to the back plate (whereby the module may have a snug fit within the receiving portion or pocket such that the module and back plate are preferably substantially water impervious). Optionally, and desirably, electrical connection to the signal indicator module may be made when the module is snapped or otherwise attached (preferably mechanically but optionally adhesively) to the back plate, such as in a similar manner as described above.

Thus, the present invention provides signal indicator modules that provide enhanced viewing of the indicia or shape to be viewed at the reflective element of the exterior rearview mirror assembly. In known applications where a window is laser ablated or otherwise established through the reflective coating of the reflective element, the size of signal indicators is limited because the mirror reflector does not reflect in the areas where the indicator is disposed. However, by incorporating the signal indicator modules of the present invention with display on demand transflective reflective elements, the illumination may transmit through the transflective reflective element for viewing by the person viewing the illuminated indicia or shape when the module is activated or energized, but the mirror reflector reflects light incident thereon so that the presence of the indicator module is not discernible when the indicator module is not activated or energized. Thus, the signal indicator module of the present invention may provide a larger display or indicia or illuminated shape or form than the prior art devices without detracting from the reflectance of the mirror reflective element (for example, the width of the chevron indicia may be at least 2 mm and even up to 4 mm or more, without adversely affecting the reflectance of light incident on the mirror reflective element), and thus the present invention provides enhanced signal indicator modules for use in blind spot indicator systems and/or turn signal indicator systems and/or the like.

Optionally, other forms of signal indication modules may be provided at a formed back plate, such as a signal indication module having a transparent or diffuse block or element (such as the types described in PCT Application No. PCT/US2006/018567, filed May 15, 2006 and published Nov. 23, 2006 as International Publication No. WO 2006/124682, and/or PCT Application No. PCT/US07/82099, filed Oct. 23, 2007, which are hereby incorporated herein by reference in their entireties) disposed at a mounting portion of a back plate, or an elongated hollow tube (such as the types described in U.S. patent applications, Ser. No. 11/520,193, filed Sep. 13, 2006; and/or Ser. No. 11/226,628, filed Sep. 14, 2005, and/or PCT Application No. PCT/US07/82099, filed Oct. 23, 2007, which are hereby incorporated herein by reference in their entireties) disposed at or formed with the back plate. For example, and with reference to FIG. 5, a back plate 120 is molded or formed to provide a mounting portion or receiving portion 126a for mounting turn signal indicator module 122a thereat and a second mounting portion or receiving portion 126b for mounting a blind spot indicator module 122b thereat. In the illustrated embodiment, turn signal indicator module 122a includes a transparent or translucent optical plastic block 140, with an illumination source 128a at a rear portion of the block and a light control film 141 disposed at the front portion of the block, and with the block mounted at the rear end region of an angled light directing element or tube 142a (which may be formed with the mounting portion 126a of back plate 120, or may be snapped to or otherwise mounted to or connected to the mounting portion 126a of back plate 120, so as to be generally aligned with an aperture 146a in back plate). Blind spot indicator module 122b includes an illumination source 128b disposed at a rear end region of a hollow tube portion 142b (which may be formed with mounting portion 126b of back plate 120, or may be snapped to or otherwise mounted to or connected to the mounting portion 126b of back plate 120, so as to be generally aligned with an aperture 146b in back plate). The signal indicator modules 122a, 122b may utilize aspects of the modules described in U.S. patent applications, Ser. No. 11/520,193, filed Sep. 13, 2006; and/or Ser. No. 11/226,628, filed Sep. 14, 2005, and/or PCT Application No. PCT/US2006/026148, filed Jul. 5, 2006 and published Jan. 11, 2007 as International Publication No. WO 2007/005942, and/or PCT Application No. PCT/US2006/018567, filed May 15, 2006 and published Nov. 23, 2006 as International Publication No. WO 2006/124682, and/or PCT Application No. PCT/US07/82099, filed Oct. 23, 2007, which are hereby incorporated herein by reference in their entireties.

Figure 5:
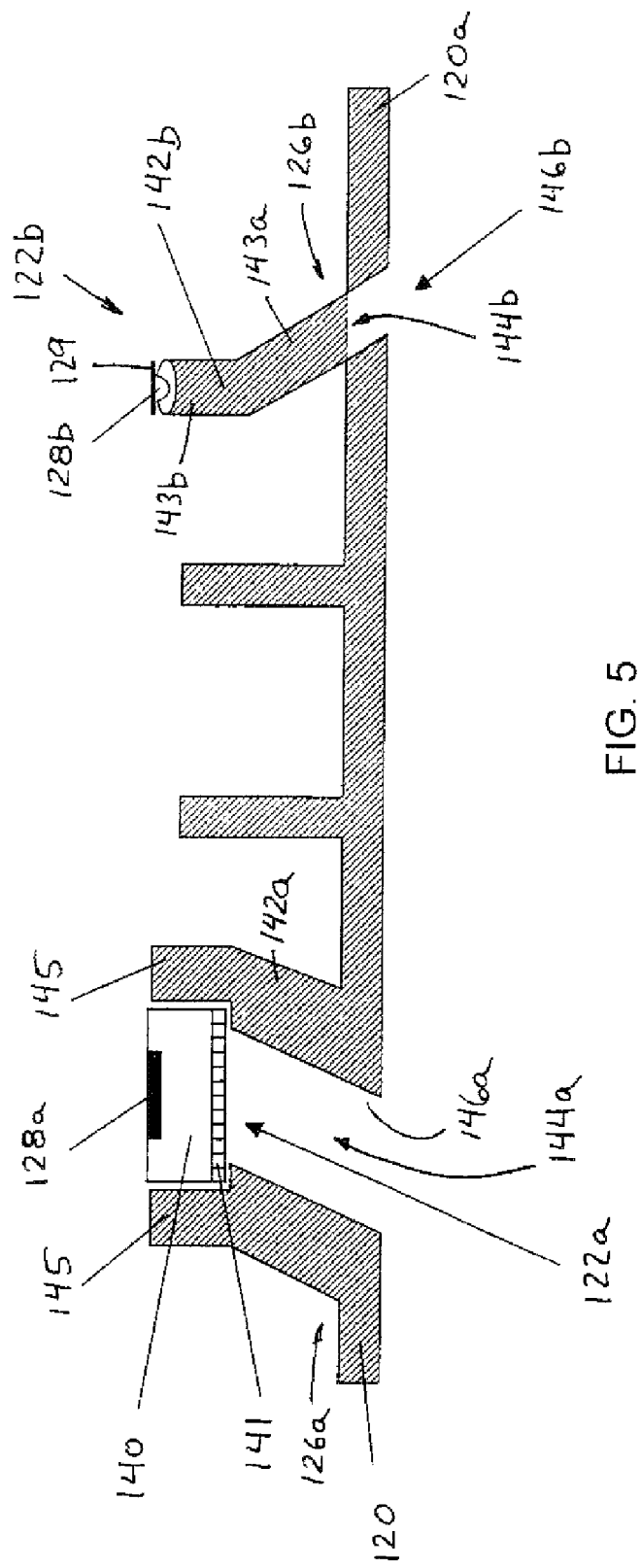
FIG. 5 is a sectional view of a back plate and indicator module construction in accordance with the present invention.

As shown in FIG. 5, the tube portions 142a, 142b each provide an angled passageway 144a, 144b, respectively, that is angled in the desired or appropriate direction relative to the generally planar portion or attaching portion 120a of back plate 120 (such as toward the side of the vehicle to which the mirror is mounted for the blind spot indicator module 122b and away from the side of the vehicle to which the mirror is mounted for the turn signal indicator module 122a). In the illustrated embodiment, the translucent block 140 is disposed at or received in the rear portion of the tube portion 142a such that the front surface of the block (with the light control film 141 disposed thereat) is generally parallel with the generally planar portion of the back plate 120. Similarly, the illumination source 128b may be disposed at a circuit element or circuit board 129 that is disposed at or received in the rear portion of the tube portion 142b such that the circuit element 129 is generally parallel with the generally planar portion of the back plate 120. Thus, illumination from the illumination sources 128a, 128b is directed generally toward the back plate and is angled or reflected via the inner walls of the passageways 144a, 144b so as to exit the back plate and transmit through the mirror reflective element in the desired or appropriate direction. Optionally, the light directing film 141 may function to angle or direct the light being transmitted through translucent or diffuse block 140 in a direction generally along the passageway 144a.

In the illustrated embodiment, tube portion 142b may be angled relative to the back plate 120, and may be bent at a rearward portion of the tube 142b. As can be seen in FIG. 5, the tube portion 142b thus includes a forward angled portion 143a at the rear of the back plate 120 and a rearward angled portion 143b at the rearward end of the forward angled portion 143a and at a different angle relative to the back plate 120. In the illustrated embodiment, the rearward angled portion 143b is generally normal to or perpendicular to the generally planar back plate portion 120a, such that the illumination source is disposed so as to be generally aligned with the passageway of the rearward angled portion and emitting light generally toward and perpendicular to the planar portion of the back plate. Likewise, a receiving portion or passageway 145 is formed or established at the rear portion of the tube portion 142a and receives block 140 therein. Because receiving passageway 145 is generally normal to or perpendicular to the generally planar portion 120a of back plate 120, block 140 is oriented to be generally parallel to planar portion 120a of back plate 120 when received in receiving passageway 145.

Optionally, and desirably, the illumination source 128a may comprise a single light emitting diode, such as a power LED, such as of the types described in U.S. Pat. No. 7,195, 381, which is hereby incorporated herein by reference in its entirety. Optionally, one or more light emitting diodes (or other suitable light source) may be provided at the cap wall (or rear wall or end of the tube portion) or optionally at a side wall of the tube portion and/or translucent block, such as by utilizing aspects of the indicator modules described in PCT Application No. PCT/US07/82099, filed Oct. 23, 2007, which is hereby incorporated herein by reference in its entirety. Likewise, the illumination source 128b may comprise one or more light emitting diodes and may be disposed at the cap wall or rear end portion of the tube portion or at a side wall of the tube portion, while remaining within the spirit and scope of the present invention.

Figure 6:
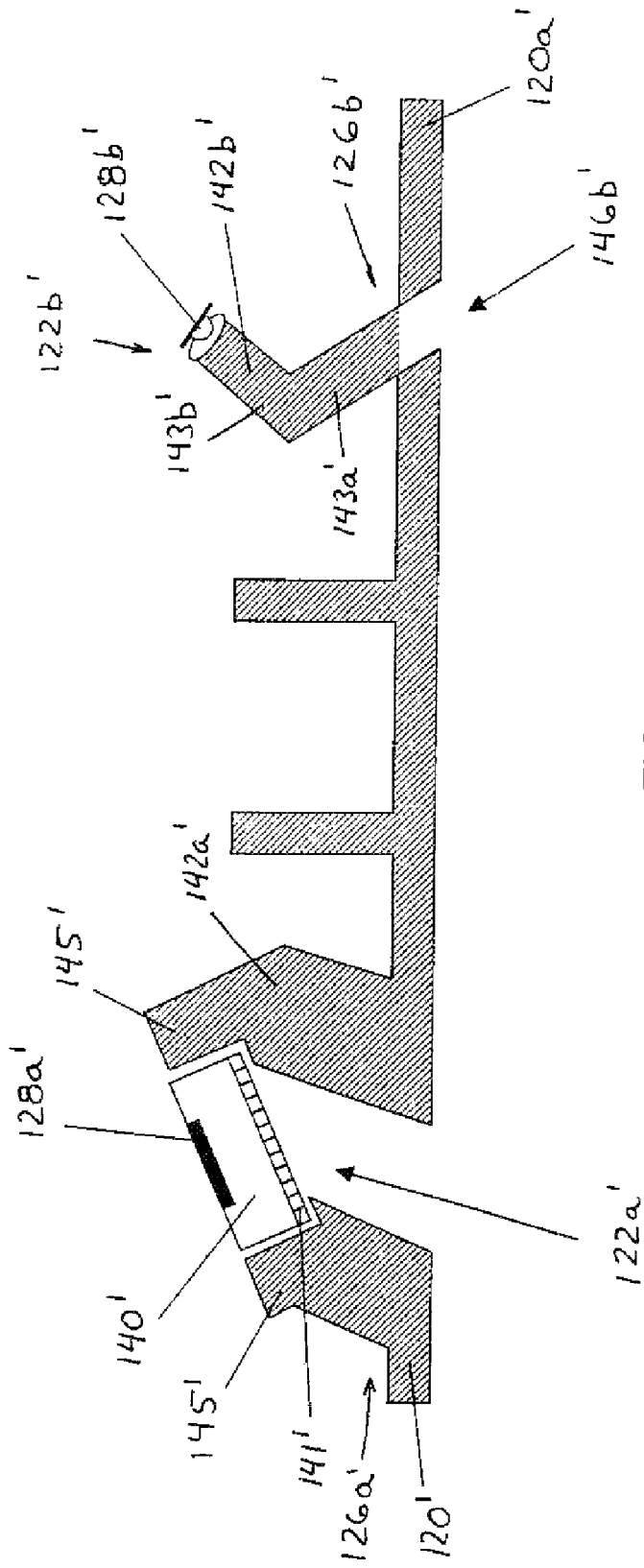
FIG. 6 is a sectional view of another back plate and indicator module construction of the present invention.

Optionally, and with reference to FIG. 6, a back plate 120' is molded or formed to provide a mounting portion or receiving portion 126a' for mounting turn signal indicator module 122a' thereat and a second mounting portion or receiving portion or tube structure 126b' for mounting a blind spot indicator module 122b' thereat. Turn signal indicator module 122a' includes a transparent or translucent optical plastic block 140', an illumination source 128a' at a rear portion of the block and a light control film 141' disposed at the front portion of the block (such as similar to indicator module 122a discussed above), with the block mounted at the rear end region of an angled light directing element or tube 142a', Blind spot indicator module 122b' includes an illumination source 128b' disposed at a rear end region of a hollow tube portion 142b' (such as similar to indicator module 122a discussed above). As shown in FIG. 6, the rear receiving passageway 145' (that receives block 140' therein) is angled so that the rear receiving passageway 145' is angled relative to the tube portion 142a' and relative to back plate 120', whereby block 140' is angled relative to the planar portion 120a' of back plate 120'.

As also shown in FIG. 6, the tube portion 142b' for the blind spot indicator module 122b' may comprise a zig-zag or bent tube, with the rearward angled portion 143b' of tube portion 142b' being angled relative to the forward angled portion 143a' so as to be angled relative to (and not normal to) the generally planar back plate portion 120a' and in a direction outboard and away from the side of the vehicle to which the mirror is mounted, while the forward angled portion 143a' of tube portion 142b' is angled relative to the generally planar back plate portion 120a' and in a direction inboard and toward the side of the vehicle to which the mirror is mounted. In the illustrated embodiment, the circuit element 129' and illumination source 128b' are disposed at the rearward end of the rearward angled portion 143b' and are angled relative to the back plate portion 120a' so as to be directed along the passageway of the rearward angled portion. The zig-zag configuration of the tube may allow for a lower profile tube portion while achieving the desired directionality and uniformity of light emanating from the tube portion and through the reflective element. The signal indication modules 122a' and 122b' of FIG. 6 may otherwise be similar to those described above, such that a detailed discussion of the signal indication modules need not be repeated herein.

Optionally, and with reference to FIGS. 7 and 7A, a signal indication module 122b'' may have the rear end portion of the rearward angled portion 143b'' of tube portion 142b'' angled or formed to receive or mount circuit element 129'' and illumination source 128b'' thereat such that the illumination source is disposed or oriented generally parallel to the generally planar portion 120a' of back plate 120'. As can be seen in FIG. 7A, such an arrangement causes the light emitting from the illumination source (with the light emitted generally toward the side wall of the tube portion) to reflect off of the inner walls of the tube and reflect along the bent passageway, which assists in directing and aligning the light rays so that the light is generally uniformly emitted from the tube and through the reflective element and the light is directed or guided in the desired direction as it exits the tube portion and passes through the reflective element of the mirror assembly (where the light exits at an angle so as to be principally viewable by the driver of the host vehicle and not readily viewable by others, such as drivers of other vehicles in the lane adjacent to the host vehicle). The aperture through the back plate may be generally aligned with the forward tube portion so as to augment the directionality of the light emanating therefrom. The signal indication modules 122a' and 122b'' of FIG. 7 may otherwise be similar to those described above, such that a detailed discussion of the signal indication modules need not be repeated herein.

Figure 8:
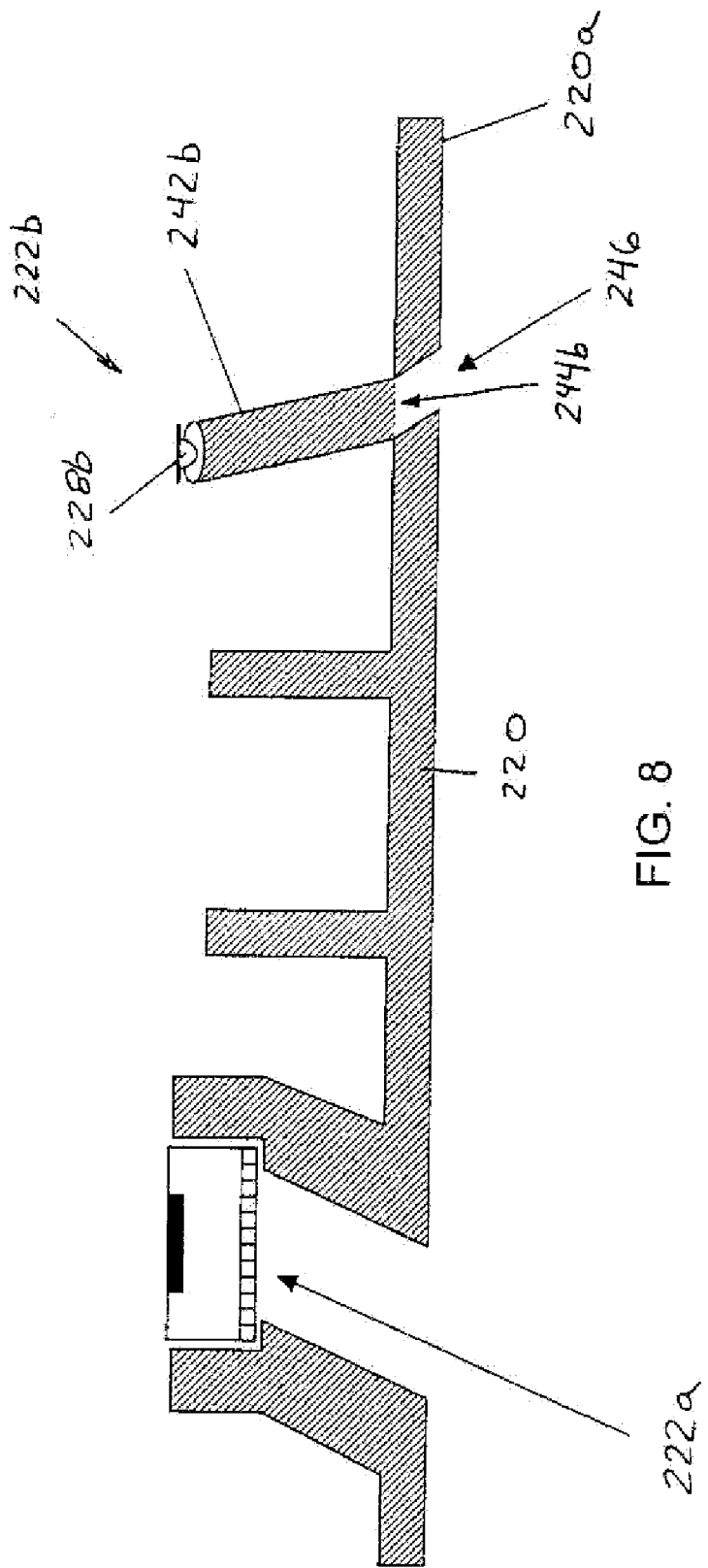
FIG. 8 is a sectional view of another back plate and indicator module construction of the present invention.

Optionally, and with reference to FIG. 8, a blind spot signal indication module 222b may include a generally straight tube portion 242b that is angled relative to the planar portion 220a of the back plate 220, while the aperture 246b formed in the back plate may be angled or canted at the same angle as the tube passageway (such as discussed above) or at a different angle than the angle of the passageway formed through the tube portion 242b (such as shown in FIG. 8). Thus, light emitting from the forward end of the tube portion 242b (via passage along the passageway 244b of tube portion 242b) may be angled or directed or guided via the angled aperture 246b so as to be directed or guided in the desired or appropriate direction (such as generally toward the side of the vehicle to which the mirror is mounted so as to be principally viewable by the driver of the vehicle). The signal indication modules 222a and 222b of FIG. 8 may otherwise be similar to those described above, such that a detailed discussion of the signal indication modules need not be repeated herein.

Optionally, an icon or indicia or pattern that defines the display (such as backlit by the illumination source of the signal indication module when the illumination source is activated) may be established at the rear of the rear substrate and between the rear surface of the rear substrate and signal indication module. The icons or pattern that define the display may be established through or defined by a dark layer or opacifying layer at the rear of the mirror substrate so that icons or iconistic portions of the dark layer form the icon or icons of the iconistic display area. Optionally, the iconistic portions of the display area may be established by etching the dark layer or by a mask or the like positioned at the rear surface of the substrate during the painting or screening or coating process that applies a dark layer. Optionally, the iconistic portions of the display area may be established by etching or masking at a fourth surface conductive busbar or coating (such as a fourth surface conductive busbar of the types described in U.S. patent applications, Ser. No. 11/021, 065, filed Dec. 23, 2004 by McCabe et al. for ELECTRO-OPTIC MIRROR CELL, now U.S. Pat. No. 7,255,451; and/ or Ser. No. 11/334,139, filed Jan. 18, 2006 by Byers et al. for MIRROR ASSEMBLY WITH HEATER ELEMENT, now U.S. Pat. No. 7,400,435; and/or U.S. provisional applications, Ser. No. 60/644,903, filed Jan. 19, 2005 by Byers et al. for MIRROR ASSEMBLY WITH HEATER ELEMENT; and Ser. No. 60/667,049, filed Mar. 31, 2005 by Byers et al. for MIRROR ASSEMBLY WITH HEATER ELEMENT, which are hereby incorporated herein by reference in their entireties). Optionally, the icons or pattern may be established via cutouts or holes or patterns or indicia portions formed in and through or partially through a heater pad (that may be attached to or adhered to the dark or opacifying layer at the rear surface of the reflective element, as discussed below), with the dark layer having an opening or aperture formed therethrough and generally corresponding with the indicia portions of the heater pad when the heater pad is adhered to the dark layer at the rear surface of the reflective element.

Optionally, the mirror reflector sub-assembly may include masks or baffles or additional light direction means or occluding means or directional filtering. For example, the mirror reflective element sub-assembly may comprise louvers or shutters for shading from view, or filters or light directing film or the like, at the rear of the reflective element (such as between the back plate and the iconistic portions) for further directing or guiding the illumination from the illumination source at the desired angle and through the reflective element so as to be principally or solely viewable by the driver of the host vehicle (for blind spot/LCA applications) or so as to be principally or solely viewable by others at the side or rear of the vehicle but not principally by the host driver (for turn signal applications).

Therefore, the present invention provides a back plate that includes one or more indicator mounting portions or display receiving portions integrally formed therewith, so that the display element or device may be readily assembled to the mirror reflector sub-assembly via attachment or adherence of the back plate to the mirror reflective element. The present invention thus provides a display element or device that is readily assembled to a mirror reflector sub-assembly, and thus facilitates assembly of the mirror reflector sub-assembly at a facility remote from the mirror assembly facility, such that the mirror reflector sub-assembly (including the back plate and indicator mounting portion) may be provided or supplied to the mirror manufacturer as a unit. The mirror manufacturer then may install or attach the indicator or indicator module to the indicator mounting or receiving portion (or may electrically connect the terminals of an already installed indicator to a wire or lead of the minor assembly), and may attach the mirror reflector sub-assembly to the mirror actuator. The present invention thus provides enhanced assembly processing of the mirror assembly, while taking advantage of the otherwise typically unused space within the casing and behind the back plate of the exterior rearview mirror assembly. For example, a mirror manufacturer may purchase a sealed, pre-assembled signal indicator module (including the necessary electrical connectors for establishing electrical connection and power and control to the module as it is attached or mounted to the reflective element or back plate), and may insert the module into the housing or shell or structure of the back plate (that is pre-configured to receive such) or may otherwise engage the module with the rear of the reflective element assembly, such as by inserting one end of the module into the side walls of the shell or structure of the back plate and against the rear of the reflective element, whereby the module makes an at least partially efficient optical connection/coupling to the rear surface or portion of the transflective reflective element or to a light transmitting portion of any heater pad disposed between the back plate and the rear of the reflective element, preferably while also making a mechanical connection and alignment to the back plate of the reflective element assembly. Note that the receiving portion of the back plate at the rear of the heater pad/reflective element and where the signal indicator/light unit emits light therethrough when its light source or light sources are activated may itself comprise a resilient light transmitting clear and/or light-diffusing material or element (such as a low durometer soft plastic material or element, such as an element having less than 120 Shore A durometer hardness for example, such as a silicone pad or film, or such as an optical adhesive or optical tape, or film) that at least one of (a) light-couples the receiving part of the back plate to the signal indicator/light unit and (b) light couples the part of the back plate where the signal indicator/light unit is disposed at (and emits light through) to the corresponding aperture or light transmitting window of the heater pad and/or to the rear surface of the substrate of the reflective element.

Optionally, a spring-like resilient light transmitting and/or light diffusing interface or pad, such as a silicone or other soft or pliable plastic having light transmitting qualities, may be provided at the interface end of the module (or at or in any aperture in the back plate where a light indicator shines through) to provide an interface at the rear (typically a glass surface that may be coated or uncoated) of the reflective element with little or no air gap between the module and the rear of the reflective element. Also, the indicator module (having a shape or structure, such as a triangular or trapezoid shape or the like, with one or more light sources or light emitting diodes and an electrical connector) may have a light transmitting element or window or lens (that may or may not have an optical light directing property) at its interfacing end that is at least somewhat soft or pliable, so that the module creates intimate contact at the rear of the reflective element when pressed against the reflective element. The module may be purchased with the light transmitting interface or pad already incorporated therein, or the pad may be a separate element at the rear of the reflective element or may be separately disposed between the module and the rear of the reflective element.

The signal indicator or blind spot indicator or turn signal indicator of the present invention thus provides a visible signal that is viewable at the exterior mirror by a person viewing the reflective element of the exterior rearview mirror at or near an appropriate angle or location relative to the exterior mirror. If the mirror reflective element is not a transflective mirror reflective element (such as a construction using laser ablation to create a hole or holes in the mirror reflector such as is now used on the likes of 2008 Toyota Tundra and 2008 Cadillac Escalade vehicles), the size of the icon or indicia of the display or signal indicator module is typically limited if used for blind spot indication, such as to a size dimension that is circumscribed by a circle having a diameter of about 5 mm to about 7 mm or less, since a larger indicator or display may interfere with viewing of the reflective element during normal driving conditions and when the signal indicator module is not activated, and may be aesthetically unacceptable. However, if the reflective element is a transflective mirror reflective element, the display area or icon or indicia may be larger than that of a non-transflective mirror reflective element, and may have a size dimension that is circumscribed by a circle having a diameter of greater than about 7 mm or preferably greater than about 15 mm and up to about 30 mm or thereabouts. This is because, for transflective mirror reflector applications, the icon or indicia or display of the signal indicator module is only viewable and discernible by a person viewing the rearview mirror assembly when it is activated and, thus, when it is desired or appropriate that the person viewing the mirror assembly readily sees and discerns the signal, and is substantially not viewable or discernible during normal driving conditions and when the signal indicator module is deactivated.

Desirably, the signal indicator module (such as for a blind spot indicator) will be sufficiently bright or intense when activated so as to be viewable during high ambient or daytime driving conditions. For example, the blind spot indication signal indicator module preferably has a luminance of preferably in the range of about 5,000 nits (candelas/square meter) to about 30,000 nits or greater when activated during daytime and when viewed via the reflective element from the front along its axis of highest brightness/directionality, and with the blind spot signal indictor behind the reflective element and emitting light therethrough. The signal indicator module is operable (such as via a photo sensor control) to have a significantly reduced intensity during low ambient lighting, night time driving conditions (and may be automatically adjusted to the reduced intensity in response to an ambient light sensor detecting an ambient light level at or below a threshold light level).

Although shown and described as being located at a driver side exterior mirror, the blind spot/LCA/turn signal indicator of the present invention may also or otherwise be located at the passenger side exterior mirror, if desired. Optionally, a blind spot indicator in accordance with the present invention may be located at both the driver side mirror assembly and the passenger side mirror assembly of the host vehicle. The indicator at either side may be selectively activated or illuminated to indicate to the driver of the host vehicle that an object or other vehicle has been detected at that particular side lane region of the host vehicle. Optionally, the blind spot indicator may be associated with a blind spot detection and indication system that includes one or more indicators at the interior rearview mirror assembly of the host vehicle. The blind spot indicators may utilize aspects of the blind spot indicators and/or blind spot detection systems described in U.S. Pat. Nos. 6,198,409; 5,929,786; and 5,786,772, and/or PCT Application No. PCT/US2006/026148, filed Jul. 5, 2006 by Donnelly Corp. et al. for VEHICLE EXTERIOR MIRROR ASSEMBLY WITH BLIND SPOT INDICATOR, and published Jan. 11, 2007 as International Publication No. WO 2007/005942, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,038,577; 6,882,287; 6,198,409; 5,929,786; and 5,786,772, and/or U.S. pat. application, Ser. No. 11/315,675, filed Dec. 22, 2005 by Higgins-Luthman for OBJECT DETECTION SYSTEM FOR VEHICLE; and/or PCT Application No. PCT/US2006/026148, filed Jul. 5, 2006 by Donnelly Corp. et al. for VEHICLE EXTERIOR MIRROR ASSEMBLY WITH BLIND SPOT INDICATOR, and published Jan. 11, 2007 as International Publication No. WO 2007/005942, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

A challenge to providing an indicator at the exterior rearview mirror reflective element is that the back plate and associated components of the exterior reflective element subassembly may be exposed to harsh environmental conditions, such as water spray, rain, dirt and debris and the like, when the reflective element is mounted at a vehicle. Thus, it is desirable to provide a sealed, water impervious indicator module or display element so as to limit or substantially preclude water ingress or the like into the module or element. Optionally, the back plate and indicator module may be integrally molded to limit water entry into the module, whereby the illumination source and/or light directing film or the like may be sealed at the module to protect the electronic components of the module. Optionally, a lens or cover element may be provided at the planar portion of the back plate and may be sealed thereat to limit water entry into the indicator module through the back plate.

Optionally, and desirably, the display element or signal indicating module may comprise a stand-alone unitary module that is a substantially sealed, water impervious, indicator module or display module, so as to be substantially impervious to water ingress or to debris ingress, and preferably with electrical terminals or connectors (such as a plug or socket connector) established or incorporated therein or with a lead or wire harness (such as a flying lead or pigtail) established or incorporated therein. The indicator module may be provided as a sealed or substantially sealed unit or module that can be snapped into or otherwise attached or secured (preferably mechanically but optionally adhesively) at the mirror back plate (and does so substantially or wholly sealingly to limit or substantially preclude water ingress to the module so that the module and back plate are substantially water impervious), preferably at the mirror sub-assembly manufacturing operation when the mirror reflective element (and any associated heater or other item or element) is joined to the mirror back plate, such as by utilizing aspects of the indicators described in U.S. patent application Ser. No. 11/520,193, filed Sep. 13, 2006, and/or PCT Application No. PCT/US2006/018567, filed May 16, 2006 and published Nov. 23, 2006 as International Publication No. WO 2006/124682, and/or PCT Application No. PCT/US07/82099, filed Oct. 23, 2007, which are hereby incorporated herein by reference in their entireties. For example, the indicator module may be provided with the illumination source and associated elements sealed to the hollow tube or sidewalls of the module, and a lens or optic element (such as a transparent lens element or the like) may be sealed at the opposite end of the hollow tube or housing structure of the module, such that both ends of the hollow tube or housing structure of the module are closed and sealed so that the module is substantially water impervious as a stand alone module. The sealed signal indicating module, including the light source and circuitry, may be supplied or provided to an assembly facility (such as a mirror assembly facility or the like) from a display element supplier, while the back plate may be molded and supplied or provided to the assembly facility from a back plate supplier. An operator at the assembly facility may attach the display device or indicator module and/or circuitry to the back plate (such as to the rear surface of the display receiving portion of the back plate), preferably by snapping the display device or module to snaps or clips or clasps or fingers or the like molded into the back plate (at its display element receiving portion) to assemble the display or indicator module to the back plate. Optionally, and desirably, the display receiving portion of the back plate and/or the display element (such as at the circuit element or circuit board) or indicator module may have attaching elements or snaps or clips or prongs (such as cooperating structure molded into the module and back plate so that the module is readily attached to or snapped or clasped to the back plate) to ease the assembly and securement of the display element or indicator module to the back plate, such as at or to a display receiving portion of the back plate, so that an operator may attach the display element or indicator module to the back plate via a snap connection or attachment.

Optionally, and desirably, electrical connection (such as to a power supply or 12 volt power wire of the vehicle battery/ignition system or to a power feed from a LIN bus controller) to the display circuitry may be made when the display element is snapped or otherwise attached (preferably mechanically but optionally adhesively) to the back plate, such as by making electrical contact between the display element and mirror circuitry (including circuitry associated with the reflective element and/or mirror assembly, such as electrochromic mirror circuitry, mirror lights and/or display circuitry and the like, typically disposed at a printed circuit board of the mirror assembly) when the display element is snapped to the back plate, such as via pressed contact or connection between respective electrical terminals or contacts of the display element and mirror circuitry as the display element is pressed or snapped or received to the display receiving portion of the back plate, such as by press attaching the display element or module into receiving fingers or clips or snaps or the like that are integrally formed with the display receiving portion of the back plate in the injection molding operation that manufactures or forms the back plate itself. For example, electrical terminals or contacts may be insert molded in the display receiving portion so as to be exposed at (or otherwise located at) the rear surface of the display receiving portion for electrical connection to the display element when the display element is attached or snapped to the display receiving portion of the back plate. Alternately, electrical connection to the display device may be made via other means, such as wires or leads or flying leads or wire harnesses or the like such as pigtails or other suitable connectors or leads, and before or after the display device is snapped or otherwise attached to the back plate, while remaining within the spirit and scope of the present invention.

Thus, a method of assembling such a mirror reflective element sub-assembly may include molding the back plate having an indicator mounting or receiving portion and providing the back plate and reflective element to an assembly facility, while also providing a display element or signal indicating module at the assembly facility. Preferably, the display element and the back plate are supplied or provided to the assembly facility from different sources. An operator at the assembly facility takes a back plate and a display element and snaps the display element to the rear surface of the display receiving portion of the back plate to attach and secure the display element at the display receiving portion. The operator also makes the electrical connection between circuitry or wiring of the mirror assembly or sub-assembly and the display element, either as the display element is snapped to the display receiving portion of the back plate (such as via contacts at the display element and display receiving portion of the back plate) or at a separate time from the attachment of the display element to the back plate (such as via separate connectors or terminals at or extending from the signal indication module or display element). Optionally, electrical connection to the display element may be made during assembly of the reflective element sub-assembly to the mirror casing of the mirror assembly (such as via connectors or leads or pigtails extending from the display element).

Thus, the display elements or devices or modules of the present invention provide a desired or appropriate iconistic display or indication that, when electrically actuated, emits light that is viewable by a person viewing the mirror reflective element. The display element may be formed with the back plate or may attach to the back plate (such as by snapping to the back plate or the like), and provides the desired angle effect relative to the reflective element. For example, the reflective element may be attached to or snapped into the back plate (which includes the display element at a perimeter region thereof), whereby the display element or module is thus positioned at a desired or appropriate angle relative to the reflective element to provide the desired or appropriate angle effect for directing the light from the light sources (when electrically actuated) in a desired or predetermined angle relative to the mirror reflective element. Thus, the display element provides the desired or appropriate preset angle when the mirror reflective element is attached to the back plate.

The blind spot indicators of the present invention thus provide a display element or indicator that is disposed at or integrally provided with the back plate. A back plate thus may be provided to a mirror manufacturer with mounting or attachment structure or receiving structure for the display element or display circuitry integrally formed with the back plate. The attachment structure or receiving portion is configured to receive or attach to a display element or display circuitry or indicator element. A mirror assembler or manufacturer may attach the display element to the attachment structure or receiving portion of the back plate (such as by snapping display circuitry or a circuit board at the attachment structure), whereby the display element is oriented at a desired angle relative to the mirror reflective element when attached to the back plate. Thus, illumination emanating from the display element is directed at the desired or appropriate angle for viewing, either by the driver of the host vehicle (for a blind spot detection system) or a driver of another vehicle (for a turn signal indicator).

The blind spot indicators of the present invention thus are operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786; and/or 5,786,772, and/or U.S. pat. applications, Ser. No. 11/239,980, filed Sep. 30, 2005 by Camilleri et al. for VISION SYSTEM FOR VEHICLE; and/or Ser. No. 11/315,675, filed Dec. 22, 2005 by Higgins-Luthman for OBJECT DETECTION SYSTEM FOR VEHICLE, and/or U.S. provisional applications, Ser. No. 60/638,687, filed Dec. 23, 2004 by Higgins-Luthman for OBJECT DETECTION SYSTEM FOR VEHICLE; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, and/or of the reverse or backup aid systems, such as the rearwardly directed vehicle vision systems described in U.S. Pat. Nos. 5,550,677; 5,760,962; 5,670,935; 5,877,897; 6,201,642; 6,396,397; 6,498,620; 6,717,610 and/or 6,757,109, and/or U.S. pat. application, Ser. No. 10/418,486, filed Apr. 18, 2003 by McMahon et al. for VEHICLE IMAGING SYSTEM, now U.S. Pat. No. 7,005,974, and/or of the automatic headlamp controls described in U.S. Pat. Nos. 5,796,094 and/or 5,715,093; and/or U.S. pat. application, Ser. No. 11/105,757, filed Apr. 14, 2005 by Schofield et al. for IMAGING SYSTEM FOR VEHICLE; and/or U.S. provisional application, Ser. No. 60/607,963, filed Sep. 8, 2004 by Schofield for IMAGING SYSTEM FOR VEHICLE, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. pat. application, Ser. No. 09/441,341, filed Nov. 16, 1999 by Schofield et al. for VEHICLE HEADLIGHT CONTROL USING IMAGING SENSOR, now U.S. Pat. No. 7,339,149, and/or PCT Application No. PCT/US2003/036177 filed Nov. 14, 2003, published Jun. 3, 2004 as PCT Publication No. WO 2004/047421 A3, with all of the above referenced U.S. patents, patent applications and provisional applications and PCT applications being commonly assigned and being hereby incorporated herein by reference in their entireties.

Optionally, the indicator or indicators of the present invention may alert the driver of the host vehicle of other situations or status or the like. For example, the indicator could function to alert the driver of the host vehicle that the brake lights of the host vehicle are functioning properly. Other applications or uses of the indicator may be implemented, without affecting the scope of the present invention.

The reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, and/or U.S. pat. applications, Ser. No. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004, now U.S. Pat. No. 7,255,451; and/or Ser. No. 11/226,628, filed Sep. 14, 2005 by Karner et al. for MOUNTING ASSEMBLY FOR VEHICLE INTERIOR MIRROR, and/or PCT Application No. PCT/US2006/018567, filed May 16, 2006 and published Nov. 23, 2006 as International Publication No. WO 2006/124682, and/or U.S. provisional applications, Ser. No. 60/695,149, filed Jun. 29, 2005; Ser. No. 60/690,400, filed Jun. 14, 2005; Ser. No. 60/681,250, filed May 16, 2005; and/or Ser. No. 60/692,113, filed Jun. 20, 2005, which are all hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics Materials and Devices for Transmittance Control, C. M. Lampert and C. G. Granquist, EDS., Optical Engineering Press, Wash. (1990), which are hereby incorporated by reference herein in their entireties. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 5,910,854; 6,420,036; and 7,274,501, and in PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication No. WO 2004/026633, which are all hereby incorporated herein by reference in their entireties.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. pat. application, Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in U.S. Pat. Nos. 7,255,451 and 7,274,501, and PCT Application No. PCT/US03/29776, filed Sep. 19, 2003 by Donnelly Corp. et al. for ELECTROCHROMIC MIRROR ASSEMBLY, and published Apr. 1, 2004 as International Publication No. WO 2004/026633; and/or PCT Application No. PCT/US03/35381, filed Nov. 5, 2003 by Donnelly Corp. et al. for ELECTRO-OPTIC REFLECTIVE ELEMENT ASSEMBLY, and published May 21, 2004 as International Publication No. WO 2004/042457; and/or U.S. patent application Ser. No. 11/226,628, filed Sep. 14, 2005 by Karner et al. for MOUNTING ASSEMBLY FOR VEHICLE INTERIOR MIRROR; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference in their entireties. Optionally, the reflective element may include indicia formed at and viewable at the reflective element, such as by utilizing aspects of the reflective elements described in PCT Application No. PCT/US2006/018567, filed May 15, 2006 and published Nov. 23, 2006 as International Publication No. WO 2006/124682; and U.S. provisional applications, Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; Ser. No. 60/774,449, filed Feb. 17, 2006; and Ser. No. 60/783,496, filed Mar. 18, 2006, which are all hereby incorporated herein by reference in their entireties.

Optionally, the reflective element may comprise a single substrate with a reflective coating at its rear surface, without affecting the scope of the present invention. The mirror assembly thus may comprise a prismatic mirror assembly or planar or non-planar mirror or other mirror having a single substrate reflective element, such as a mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004 by Donnelly Corporation et al. for MIRROR ASSEMBLY FOR VEHICLE, and published Dec. 2, 2004 as International Publication No. WO 2004/103772; and U.S. pat. application, Ser. No. 10/933,842, filed Sep. 3, 2004, now U.S. Pat. No. 7,249,860, which are hereby incorporated herein by reference in their entireties. Optionally, the reflective element may comprise a conventional prismatic or flat reflective element or prism, or may comprise a prismatic or flat reflective element of the types described in PCT Application No. PCT/US03/29776, filed Sep. 19, 2003 by Donnelly Corp. et al. for MIRROR REFLECTIVE ELEMENT ASSEMBLY, and published Apr. 1, 2004 as International Publication No. WO 2004/026633; U.S. pat. applications, Ser. No. 10/709,434, filed May 5, 2004 by Lynam for MIRROR REFLECTIVE ELEMENT, now U.S. Pat. No. 7,420,756; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004 by McCabe et al. for ELECTRO-OPTIC MIRROR CELL, now U.S. Pat. No. 7,255,451; and/or Ser. No. 10/993,302, filed Nov. 19, 2004 by Lynam for MIRROR REFLECTIVE ELEMENT FOR A VEHICLE, now U.S. Pat. No. 7,338,177, and/or PCT Application No. PCT/US2004/015424, filed May 18, 2004 by Donnelly Corp. et al. for MIRROR ASSEMBLY FOR VEHICLE, and published Dec. 2, 2004 as International Publication No. WO 2004/103772, which are all hereby incorporated herein by reference in their entireties, without affecting the scope of the present invention.

Optionally, the mirror assembly may include one or more displays, such as the types disclosed in U.S. Pat. Nos. 5,530,240 and/or 6,329,925, which are hereby incorporated herein by reference in their entireties, and/or display-on-demand or transflective type displays, such as the types disclosed in U.S. Pat. Nos. 6,690,268; 5,668,663 and/or 5,724,187, and/or in U.S. pat. applications, Ser. No. 10/054,633, filed Jan. 22, 2002 by Lynam et al. for VEHICULAR LIGHTING SYSTEM, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 by Hutzel et al. for ACCESSORY SYSTEM FOR VEHICLE; Ser. No. 11/284,543, filed Nov. 22, 2005, now U.S. Pat. No. 7,370,983; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication No. WO 2004/026633; and/or PCT Application No. PCT/US03/35381, filed Nov. 5, 2003 by Donnelly Corp. et al. for ELECTRO-OPTIC REFLECTIVE ELEMENT ASSEMBLY, and published May 21, 2004 as International Publication No. WO 2004/042457; and/or U.S. provisional applications, Ser, No. 60/630,061, filed Nov. 22, 2004 by Lynam et al. for MIRROR ASSEMBLY WITH VIDEO DISPLAY; Ser. No. 60/667,648, filed Mar. 31, 2005 by Lynam et al. for MIRROR ASSEMBLY WITH VIDEO DISPLAY; Ser. No. 60/629,926, filed Nov. 22, 2004 by McCabe et al. for METHOD OF MANUFACTURING ELECTRO-OPTIC MIRROR CELL; Ser. No. 60/531,838, filed Dec. 23, 2003; Ser. No. 60/553,842, filed Mar. 17, 2004; and Ser. No. 60/563,342, filed Apr. 19, 2004, and/or PCT Application No. PCT/US03/40611, filed Dec. 19, 2003 by Donnelly Corp. et al. for ACCESSORY SYSTEM FOR VEHICLE, and published Jul. 15, 2004 as International Publication No. WO 2004/058540, which are all hereby incorporated herein by reference in their entireties, or may include or incorporate video displays or the like, such as the types described in PCT Application No. PCT/US03/40611, filed Dec. 19, 2003 by Donnelly Corp. et al. for ACCESSORY SYSTEM FOR VEHICLE, and published Jul. 15, 2004 as International Publication No. WO 2004/058540, and/or U.S. patent applications, Ser. No. 10/538,724, filed Jun. 13, 2005; and/or Ser. No. 11/284,543, filed Nov. 22, 2005, now U.S. Pat. No. 7,370,983; and/or U.S. provisional applications, Ser. No. 60/630,061, filed Nov. 22, 2004 by Lynam et al. for MIRROR ASSEMBLY WITH VIDEO DISPLAY; and Ser. No. 60/667,048, filed Mar. 31, 2005 by Lynam et al. for MIRROR ASSEMBLY WITH VIDEO DISPLAY, which are hereby incorporated herein by reference in their entireties.

The constructions of the present invention are economical and effective compared to the more complicated and potentially more costly constructions of other mirror assemblies. The present invention thus obviates the cost and complexity of use of an optics block with collimating and deviator portions to control direction of light rays, or any equivalent thereof, such as is disclosed in PCT Application No. PCT/US00/07437, filed Mar. 7, 2005 by Gentex Corporation for OPTICS FOR CONTROLLING THE DIRECTION OF LIGHT RAYS AND ASSEMBLIES INCORPORATING THE OPTICS, and published Sep. 22, 2005 as International Publication No. WO 2005/086777, which is hereby incorporated herein by reference in its entirety.

Changes and modifications to the specifically described embodiments may be carried out without departing from the principles of the present invention, which is intended to be limited only by the scope of the appended claims as interpreted according to the principles of patent law.

The invention claimed is:

1. A mirror reflective element sub-assembly suitable for use for an exterior rearview mirror assembly of a vehicle, said mirror reflective element sub-assembly comprising:
   a mirror reflective element;
   a mirror back plate attached to the rear of said mirror reflective element, said mirror back plate formed in a plastic injection molding operation and having an indicator receiving portion established thereat by said plastic injection molding operation;
   a signal indication module having a light source that is activatable to emit light, said signal indication module attaching to said indicator receiving portion of said mirror back plate and said light source being activatable to emit light through said indicator receiving portion; and
   wherein said light source is disposed at a circuit element and said signal indication module includes a housing that substantially encases said circuit element therein, said circuit element comprising electrical terminals extending therefrom and protruding at least partially at a connector portion of said housing so as to be electrically connectable to a power source of the vehicle, said connector portion of said housing being configured to provide a plug-socket connection between the power source and said signal indication module.

2. The mirror reflective element sub-assembly of claim 1, wherein said signal indication module substantially seals at said indicator receiving portion when attached thereto such that said signal indication module and said indicator receiving portion are substantially water impervious.

3. The mirror reflective element sub-assembly of claim 1, wherein said housing includes at least one passageway therethrough, said emitted light being directed through said at least one passageway.

4. The mirror reflective element sub-assembly of claim 1, wherein said signal indication module comprises an indicia element at a forward end thereof, said illumination source being activatable to emit illumination, whereby said illumination is transmitted through said indicia element when said illumination source is activated.

5. The mirror reflective element sub-assembly of claim 1, wherein said display element is associated with a blind spot detection system of the vehicle.

6. The mirror reflective element sub-assembly of claim 1, wherein said display element is associated with a turn signal of the vehicle.

7. The mirror reflective element sub-assembly of claim 1, wherein said housing comprises a light reflecting material.

8. The mirror reflective element sub-assembly of claim 7, wherein said housing comprises diffusely light reflecting inner surfaces for reflecting light incident thereon to enhance the intensity of illumination that exits said indicator module through said indicator receiving portion.

* * * * *

UNITED STATES PATENT AND TRADEMARK OFFICE
CERTIFICATE OF CORRECTION

| | |
|---|---|
| PATENT NO. | : 7,944,371 B2 |
| APPLICATION NO. | : 12/264669 |
| DATED | : May 17, 2011 |
| INVENTOR(S) | : Keith D. Foote and Niall R. Lynam |

Page 1 of 1

It is certified that error appears in the above-identified patent and that said Letters Patent is hereby corrected as shown below:

Column 1
Line 7, "No," should be --No.--

Column 2
Line 46, "element," should be --element--

Column 3
Line 17, Insert --(-- before "preferably"

Column 8
Line 34, "No.," should be --No.--

Column 13
Line 21, "angled," should be --angled--

Column 19
Line 38, "142a'," should be --142a'--

Column 21
Line 48, "minor" should be --mirror--

Column 22
Line 13, "tape," should be --tape--

Column 29
Line 57, "Ser," should be --Ser.--
Line 59, "60/667,648" should be --60/667,048--

Signed and Sealed this
Twenty-second Day of November, 2011

David J. Kappos
*Director of the United States Patent and Trademark Office*